(12) United States Patent
Noda

(10) Patent No.: US 11,769,211 B2
(45) Date of Patent: Sep. 26, 2023

(54) VEHICLE INSURANCE SYSTEM, VEHICLE DEALER TERMINAL, AND VEHICLE SALES METHOD

(71) Applicant: TOYOTA JIDOSHA KABUSHIKI KAISHA, Toyota (JP)

(72) Inventor: Kumiko Noda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/669,814

(22) Filed: Feb. 11, 2022

(65) Prior Publication Data

US 2022/0301067 A1 Sep. 22, 2022

(30) Foreign Application Priority Data

Mar. 22, 2021 (JP) ................................. 2021-047307
Nov. 30, 2021 (JP) ................................. 2021-194631

(51) Int. Cl.
  G06Q 40/08 (2012.01)
  G06Q 30/02 (2023.01)
  G06Q 30/0283 (2023.01)
(52) U.S. Cl.
  CPC ......... *G06Q 40/08* (2013.01); *G06Q 30/0283* (2013.01)
(58) Field of Classification Search
  CPC .......................... G06Q 40/08; G06Q 30/0283

USPC ............................................................. 705/4
See application file for complete search history.

(56) References Cited

U.S. PATENT DOCUMENTS

| 11,361,379 B1* | 6/2022 | Rodoni ................. G06Q 40/08 |
| 2014/0279707 A1* | 9/2014 | Joshua ............... G06Q 30/0283 |
| | | 701/1 |
| 2021/0201420 A1* | 7/2021 | Kaneichi ............ G06Q 30/0283 |

FOREIGN PATENT DOCUMENTS

JP 2020-149679 A 9/2020

* cited by examiner

*Primary Examiner* — Robert R Niquette
(74) *Attorney, Agent, or Firm* — Oliff PLC

(57) ABSTRACT

A vehicle insurance system includes: a registration unit that registers a subject vehicle including a power storage device and a subject period in response to payment of an insurance premium for the subject period when the subject vehicle is sold; a ranking unit that ranks a purchaser of the subject vehicle based on vehicle usage information about vehicle usage of the purchaser; an insurance premium determination unit that determines at least one of the insurance premium for the subject period and a renewal fee for extending the subject period, based on a rank of the purchaser; and an insurance benefit determination unit that determines an insurance benefit compensating for at least a part of a loss of asset value of the power storage device due to degradation of the power storage device, when the subject vehicle is sold within the subject period.

13 Claims, 18 Drawing Sheets

《TIME OF VEHICLE PURCHASE》

| USER ID | INSURANCE INFORMATION | | | .... |
| --- | --- | --- | --- | --- |
| | SUBJECT VEHICLE | SUBJECT PERIOD | RANK | |
| UID-1 | VID-1 | 2021/X/X-2022/Y/Y | A | .... |
| UID-2 | VID-2 | 2021/X/X-2022/Y/Y | C | .... |
| UID-3 | VID-3 | 2021/X/X-2022/Y/Y | B | .... |
| UID-4 | VID-4 | 2021/X/X-2022/Y/Y | B | .... |
| ⋮ | ⋮ | ⋮ | ⋮ | .... |

FIG.8

《FEE TABLE》

| RANK | INITIAL INSURANCE FEE | RENEWAL FEE |
|---|---|---|
| A | 10,000 YEN/YEAR | 5,000 YEN/YEAR |
| B | 20,000 YEN/YEAR | 7,500 YEN/YEAR |
| C | 30,000 YEN/YEAR | 10,000 YEN/YEAR |

FIG.9

CACHELESS PAYMENT

M11

BATTERY DEGRADATION INSURANCE:
　　WHEN THE VEHICLE IS SOLD, A VALUE LOSS DUE TO
　　BATTERY DEGRADATION IS COMPENSATED FOR.

INITIAL INSURANCE FEE: ＊＊＊＊ YEN

SUBJECT PERIOD: 2021/X/X – 2022/Y/Y

M12

DO YOU PAY INSURANCE PREMIUMS?

M13　YES　　　　　　M14　NO

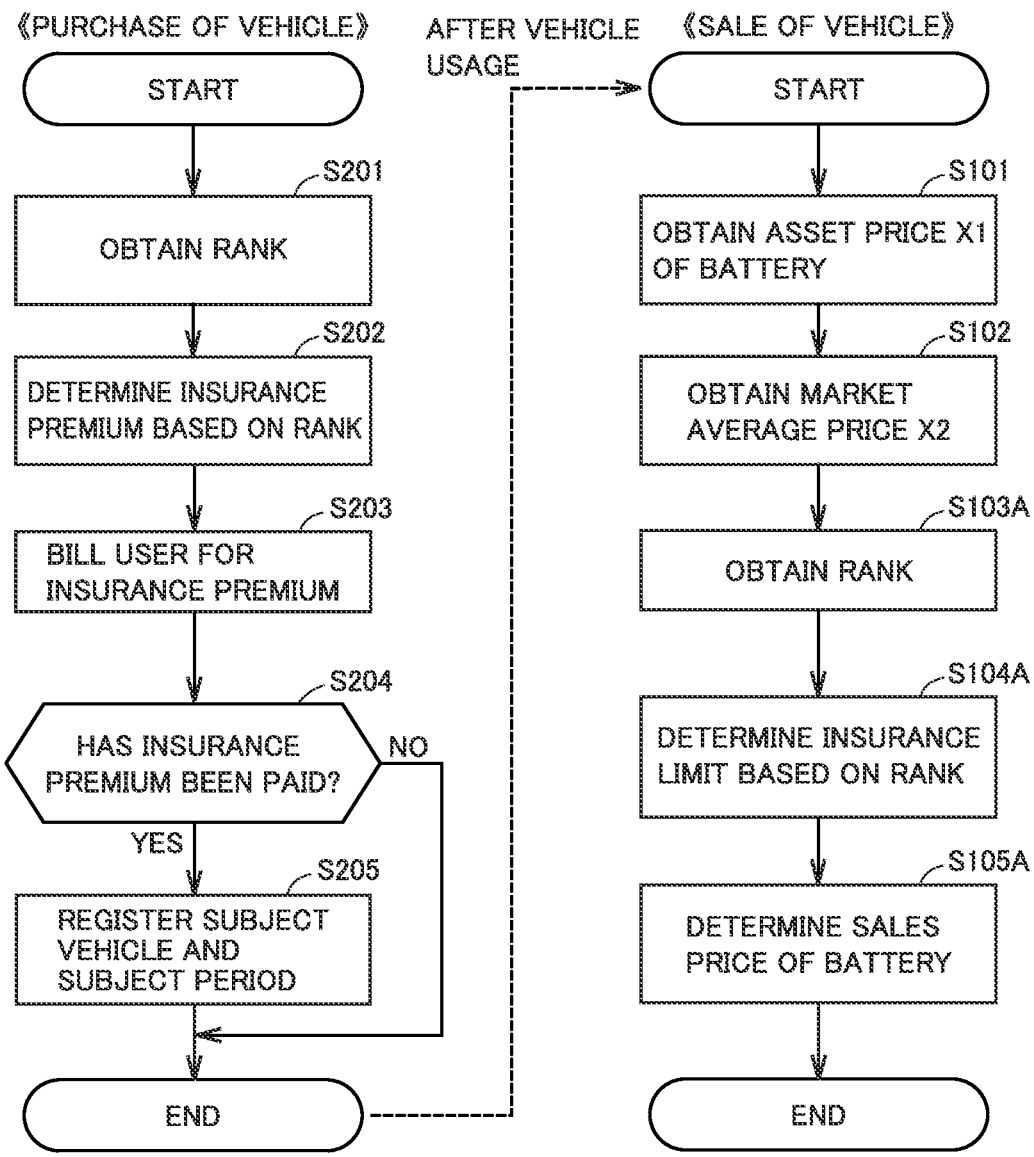

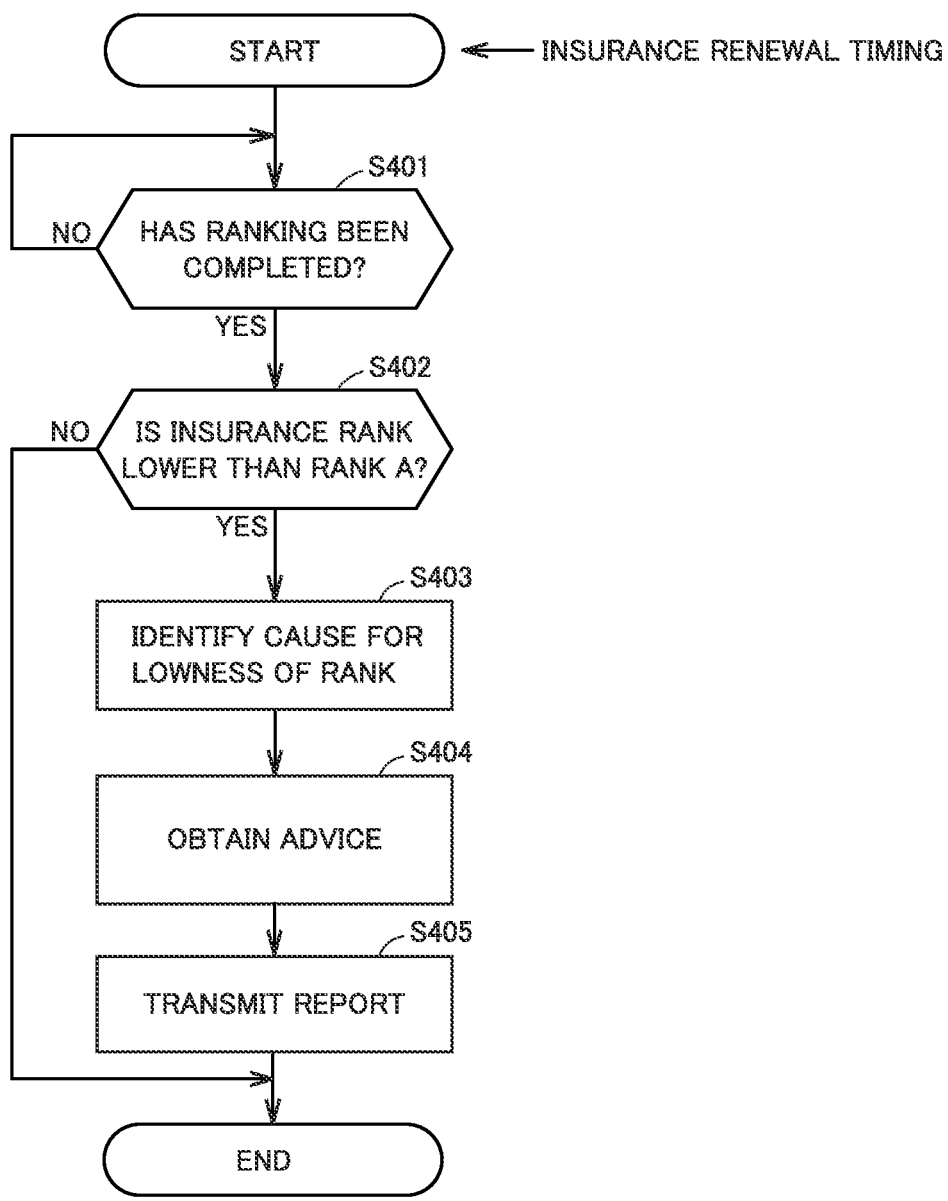

| USER ID | INSURANCE INFORMATION | INTENDED USE OF VEHICLE | TRAVELING FREQUENCY | CHARGING METHOD | .... |
|---|---|---|---|---|---|
| UID-1 | ... | COMMUTING | DAILY | TIMER | .... |
| UID-2 | ... | COMMUTING | WEEKDAY | HV | .... |
| UID-3 | ... | SHOPPING | DAILY | DAILY | .... |
| UID-4 | ... | LEISURE | WEEKEND | LOW SOC | .... |
| : | : | : | : | : | .... |

VEHICLE INSURANCE SYSTEM, VEHICLE DEALER TERMINAL, AND VEHICLE SALES METHOD

This nonprovisional application is based on Japanese Patent Application No. 2021-047307 filed on Mar. 22, 2021 and No. 2021-194631 filed on Nov. 30, 2021 with the Japan Patent Office, the entire contents of which are hereby incorporated by reference.

BACKGROUND

Field

The present disclosure relates to a vehicle insurance system, a vehicle dealer terminal, and a vehicle sales method.

Description of the Background Art

Japanese Patent Laying-Open No. 2020-149679 discloses a system for lending a battery used in a vehicle to a user. In this system, when the user pays a lending fee, the vehicle is allowed to travel until an index indicating a degree of progress of battery degradation changes by a prescribed amount. With such a mechanism, degradation of the battery in the lease vehicle is suppressed.

SUMMARY

Japanese Patent Laying-Open No. 2020-149679 does not investigate the problem of battery degradation in a POV (personal owned vehicle). When a POV is used in a manner in which the battery is likely to deteriorate by the user, the asset value of the battery is greatly reduced due to the degradation. Therefore, when the POV is sold, the sales price of the POV (including the battery) may be much lower than expected.

Compared to a conventional vehicle (an automobile using only an internal combustion engine as a power source for driving), the history of xEV (an electric vehicle using electric power as all or part of the power source) is still shallow and few users have knowledge about xEV. The user is highly likely not to know how to use xEV where the battery is less likely to deteriorate. For such users, it is severe that the degradation of batteries used in vehicles causes excessive loss of asset values.

The present disclosure was made to solve the problem above, and an object thereof is to provide an insurance service that compensates for at least a part of loss of asset value due to degradation of a power storage device used in a vehicle.

A vehicle insurance system according to a first aspect of the present disclosure includes a registration unit, a ranking unit, an insurance premium determination unit, and an insurance benefit determination unit as described below. The registration unit registers a subject vehicle including a power storage device and a subject period in response to payment of an insurance premium for the subject period when the subject vehicle is sold. The ranking unit ranks a purchaser of the subject vehicle based on vehicle usage information about vehicle usage of the purchaser (a way in which the purchaser uses a vehicle). The insurance premium determination unit determines at least one of the insurance premium for the subject period and a renewal fee for extending the subject period, based on a rank of the purchaser. The insurance benefit determination unit determines an insurance benefit compensating for at least a part of a loss of asset value of the power storage device due to degradation of the power storage device, when the subject vehicle is sold within the subject period.

The vehicle insurance system can provide an insurance service compensating for at least a part of a loss of asset value of the power storage device used in the subject vehicle (insured vehicle), due to degradation of the power storage device. The service provider (insurance company, for example) can receive the insurance premium or renewal fee determined by the insurance premium determination unit, and pay the insurance benefit determined by the insurance benefit determination unit, to thereby provide the insurance service.

In the vehicle insurance system, the registration unit performs insurance registration (registration for insurance) when the subject vehicle is sold. When the subject vehicle is later sold within the subject period (insurance period), the insurance benefit determination unit determines the insurance benefit. When the vehicle is bought (when insurance registration is performed), the status of the power storage device can easily be recognized with high accuracy, which facilitates management of the degree of degradation of the power storage device from the purchase to the selling of the vehicle.

In the vehicle insurance system, the ranking unit and the insurance premium determination unit can adjust the balance between the insurance service fee (fee for receiving the insurance service) and the insurance benefit (money paid from the insurance service to the insured). The ranking unit ranks the user (purchaser of the subject vehicle) based on vehicle usage information regarding the way in which the user uses a vehicle. The insurance premium determination unit then determines the insurance service fee (insurance premium and/or renewal fee) based on the rank of the user. The vehicle insurance system can therefore vary the insurance service fees charged to the user depending on the way in which the user uses the vehicle. For example, if users who fail to use the vehicle in a recommended manner increase, the insurance benefit may increase excessively relative to the insurance service fee and accordingly the insurance business may become ineffective. In contrast, the above-described vehicle insurance system uses the above mechanism provided by the ranking unit and the insurance premium determination unit to set the insurance premium higher for users who do not use a vehicle in a recommended way, to thereby suppress increase of such users.

The insurance premium for the initial subject period may be included in the price of the subject vehicle. In other words, payment of the price of the subject vehicle may be recognized as payment of the insurance premium for the subject period. Then, the renewal fee (fee for extending the subject period) may be determined thereafter based on the insurance rank (rank of the user determined by the ranking unit).

The vehicle usage information may include information about a capacity retention ratio of a vehicle-mounted power storage device. The ranking unit may rank the purchaser higher as the vehicle usage keeps the capacity retention ratio higher. When the insurance premium determination unit determines the insurance premium or the renewal fee, the insurance premium determination unit may set the insurance premium or the renewal fee lower as the purchaser is ranked higher.

As users who use a vehicle in such a way that promotes degradation of the power storage device increase, the insurance benefit may increase excessively relative to the insurance service fee, and accordingly the insurance business may become ineffective. With the above-described configuration, the insurance premium for users who use a vehicle in such a way that promotes degradation of the power storage device can be set higher to suppress increase of such users.

The ranking unit may rank the purchaser, based on, as the vehicle usage information, the number of vehicle trips per unit period, the number of charging operations of a vehicle-mounted power storage device per unit period, and a ratio of a time for which an SOC of a vehicle-mounted power storage device is a predetermined value or more to an inactive period.

The number of travels of the subject vehicle per unit period is hereinafter also referred to as "traveling frequency." The number of travels may be the number of times the vehicle travels, or the number of days on which the vehicle travels. The number of charging operations of the power storage device per unit period is also referred to herein as "charging frequency." The number of charging operations may be the number of times the power storage device is charged, or the number of days on which the power storage device is charged. The ratio of the time for which the SOC of the power storage device is a predetermined value or more, to an inactive period, is also referred to as "high SOC ratio."

In the vehicle usage information, particularly the traveling frequency, the charging frequency, and the high SOC ratio are likely to influence the proneness to degradation of the power storage device. With the above-described configuration, the ranking unit can easily and appropriately rank the user (purchaser of the subject vehicle) in terms of proneness to degradation of the power storage device.

The SOC (State Of Charge) is the amount of remaining charge and represents, for example, the ratio of the current amount of charge to the full charge in 0 to 100%.

Any vehicle insurance system as described above may further include a sales price determination unit that determines a sales price of the power storage device. When an asset price of the power storage device indicated by a result of a performance evaluation test of the power storage device is lower than a reference price, the insurance benefit determination unit may determine that the insurance benefit is a difference between the asset price of the power storage device and the reference price, and the sales price determination unit may determine that the sales price of the power storage device is the reference price.

With the above-described configuration, insurance is applied when the asset price of the power storage device is lower than the reference price, so that the difference between the asset price of the power storage device and the reference price is compensated for by the insurance benefit. Accordingly, excessive decrease of the asset value of the user (purchaser of the subject vehicle) due to degradation of the power storage device can be suppressed.

The sales price determination unit may determine the sales price of the subject vehicle including the sales price of the power storage device. The reference price may be an average market price, or a price obtained from a database of the auto manufacturer (for example, the average sales price of power storage devices of the same type that were sold in the past).

When the asset price of the power storage device indicated by the result of the performance evaluation test is higher than the reference price, the sales price determination unit may determine that the sales price of the power storage device is the asset price of the power storage device. With such a configuration, insurance is not applied when the asset value of the power storage device is higher than the reference price, and accordingly no insurance benefit is paid. In this way, the balance between the insurance service fee and the insurance benefit is adjusted.

The vehicle usage information may include a result of the performance evaluation test when the purchaser sells the subject vehicle. The ranking unit may rank the purchaser higher as an asset price of the power storage device indicated by the result of the performance evaluation test is higher.

If the asset price of the power storage device indicated by the result of the test (the performance evaluation test of the power storage device) conducted when the vehicle is sold is higher, there is a higher possibility that the vehicle has been used in a manner in which the power storage device is less prone to degrade. With the above-described configuration, the insurance premium can be lowered for a user having used the vehicle in such a manner. Such adjustment of the insurance premium can provide the user with an incentive to consciously use a vehicle in such a manner in which degradation of the power storage device is suppressed.

The insurance benefit determination unit may set an upper limit of the insurance benefit higher as the purchaser is ranked higher. The upper limit of the insurance benefit is hereinafter also referred to as "insurance limit."

With the above-described configuration, the insurance limit can be varied depending on the way in which the user uses a vehicle. Thus, the insurance limit can be increased for users who use a vehicle in the recommended way, to promote increase of such users.

The insurance premium determination unit may determine the renewal fee based on the rank of the purchaser before expiration of the subject period. The registration unit may extend the subject period when the renewal fee is paid before expiration of the subject period. With such a configuration, the renewal fee can be varied depending on the way in which the user uses a vehicle. Thus, the renewal fee can be lowered for users who use a vehicle in the recommended way, to promote increase of such users.

When the rank of the purchaser indicated by a result of the ranking is lower than a predetermined rank, the ranking unit may be configured to identify a cause for lowness of the rank of the purchaser, based on information obtained from the ranking, and transmit a report indicating the identified cause to the purchaser. When the rank of the purchaser is reduced, such a configuration makes it easier for the purchaser to identify the cause for lowness of the rank.

The report may include an advice regarding rank improvement. Such a configuration makes it easier for the purchaser to improve the rank.

The ranking unit may identify the vehicle usage of the purchaser, based on information obtained from the ranking, and guide the purchaser to buy a vehicle for replacement, based on the identified vehicle usage.

With the above-described configuration, information obtained from ranking is used for any service other than the insurance service. Specifically, the information obtained from ranking is used to guide the user (purchaser of the subject vehicle) to buy a vehicle for replacement. The information obtained from ranking can be used to identify the way in which the user uses a vehicle and introduce a proper vehicle to the user. With this configuration, the information obtained from ranking can be used effectively to provide valuable information to the user.

In any vehicle insurance system as described above, the subject vehicle may be xEV (vehicle of which power source is partially or entirely electric power). The xEV includes BEV (Battery Electric Vehicle), HEV (Hybrid Electric Vehicle), PHEV (Plug-in Hybrid Electric Vehicle), and FCEV (Fuel Cell Electric Vehicle). For xEV, the ratio of the asset value of the power storage device to the asset value of the vehicle is high, and the asset value of the xEV is thus likely to vary due to degradation of the power storage device. The above-described insurance service is therefore particularly useful.

The above-described registration unit, ranking unit, insurance premium determination unit, insurance benefit determination unit, and sales price determination unit may be implemented on a single computer all together, or distributed to and implemented on a plurality of computers.

A vehicle dealer terminal according to a second aspect of the present disclosure includes a registration unit, a ranking unit, an insurance premium determination unit, and an insurance benefit determination unit as described below. The registration unit registers a subject vehicle including a power storage device and a subject period in response to payment of an insurance premium for the subject period when the subject vehicle is sold. The ranking unit ranks a purchaser of the subject vehicle based on vehicle usage information about vehicle usage of the purchaser (a way in which the purchaser uses a vehicle). The insurance premium determination unit determines at least one of the insurance premium for the subject period and a renewal fee for extending the subject period, based on a rank of the purchaser. The insurance benefit determination unit determines an insurance benefit compensating for at least a part of a loss of asset value of the power storage device due to degradation of the power storage device, when the subject vehicle is sold within the subject period.

The above vehicle dealer terminal, similarly to the above vehicle insurance system, can also provide an insurance service that compensates for at least a part of a loss of the asset value of the power storage device used in the subject vehicle, due to degradation of the power storage device.

A vehicle sales method according to a third aspect of the present disclosure is a vehicle sales method for selling, to a user having sold a first vehicle including a first power storage device, a second vehicle including a second power storage device, and includes the following operations A to F.

Operation A obtains vehicle usage information about a way in which the user uses the first vehicle. Operation B ranks the user based on the vehicle usage information. Operation C sells the second vehicle to the user. Operation D determines an insurance premium for a subject period based on a rank of the user. Operation E registers the second vehicle and the subject period in response to payment of the insurance premium for the subject period. Operation F determines an insurance benefit compensating for at least a part of a loss of asset value of the second power storage device due to degradation of the second power storage device, when the second vehicle is sold within the subject period.

The above-described vehicle sales method, similarly to the above vehicle insurance system, can also provide an insurance service that compensates for at least a part of a loss of the asset value of the power storage device used for the subject vehicle, due to degradation of the power storage device.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 8 is a diagram showing an example of a fee table used in the process shown in FIG. 7.

FIG. 9 is a diagram showing an example of a screen on which a dealer terminal bills a user for an insurance premium in the process shown in FIG. 7.

FIG. 18 is a flowchart showing a modified example of the process shown in FIG. 6.

FIG. 19 is a diagram showing a modified example of the fee table shown in FIG. 8.

FIG. 20 is a flowchart showing a process related to creation and transmission of a report in a modified example of the vehicle insurance system.

DESCRIPTION OF THE PREFERRED EMBODIMENTS

Figure 1:
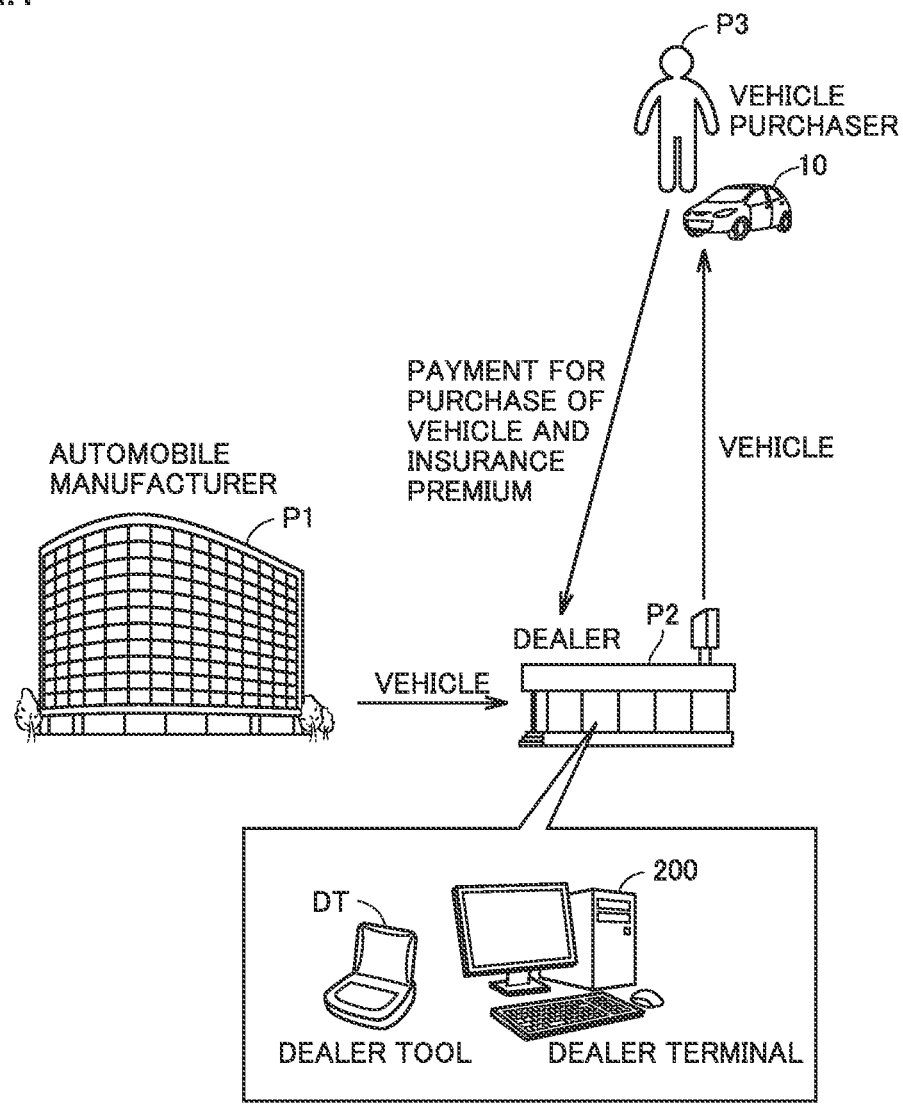
FIG. 1 is a diagram illustrating an operation of a vehicle insurance system when a vehicle is purchased in an embodiment of the present disclosure.

Embodiments of the present disclosure will be described in detail below with reference to the drawings. The same or corresponding elements in the drawings have the same reference characters allotted and description thereof will not be repeated.

First, an overview of a business model realized by the vehicle insurance system according to the present embodiment will be described with reference to FIGS. 1 and 2.

FIG. 1 is a diagram illustrating an operation of a vehicle insurance system when a vehicle is purchased in this embodiment.

Referring to FIG. 1, an automobile manufacturer P1 sells a vehicle through a dealer P2. The dealer P2 is an automobile sales store that sells vehicles manufactured by the automobile manufacturer P1 and provides after-sales service (for example, inspection and maintenance). The dealer P2 procures a vehicle from an automobile manufacturer P1 and sells the vehicle to a vehicle purchaser P3. When the dealer P2 receives the order of the vehicle from the vehicle purchaser P3, the vehicle manufactured by the vehicle manufacturer P1 is supplied to the dealer P2. Then, the vehicle (for example, the vehicle 10 shown in FIG. 1) is delivered from the dealer P2 to the vehicle purchaser P3. In this embodiment, the vehicle (including the vehicle 10) sold by the dealer P2 is a new vehicle (an unused vehicle in which an unused power storage device is mounted). In this embodiment, the vehicle 10 purchased by the vehicle purchaser P3 is a PHEV (plug-in hybrid electric vehicle).

The dealer P2 has a dealer terminal 200 and a dealer tool DT. The dealer tool DT is a device that reads data accumulated in the vehicle from the vehicle. The dealer tool DT is manufactured by the automobile manufacturer P1 so as to correspond to the vehicle manufactured by the automobile manufacturer P1, and is provided from the automobile manufacturer P1 to the dealer P2.

In this embodiment, the automobile manufacturer P1 provides an insurance service to the vehicle purchaser P3 through the dealer P2. The automobile manufacturer P1 also serves as an insurance company, and the dealer P2 also serves as an insurance agency. The insurance service provided by the automobile manufacturer P1 and the dealer P2 is an insurance service that compensates for at least a part of loss of asset value due to degradation of the power storage device used in the vehicle. The dealer P2 prompts the vehicle purchaser P3 to determine whether or not to subscribe to the insurance of the vehicle when the vehicle purchaser P3 purchases the vehicle. Specifically, the dealer P2 determines an insurance premium (a fee of an insurance service) and bills the vehicle purchaser P3 for the insurance premium. A method of determining the insurance premium will be described later. The insurance contract is established when the vehicle purchaser P3 pays an insurance premium to the dealer P2. When the vehicle purchaser P3 pays an insurance premium, the vehicle purchaser P3 receives an insurance service. Details of the insurance service will be described later. If the vehicle purchaser P3 does not pay an insurance premium, the vehicle purchaser P3 cannot receive an insurance service.

Figure 2:
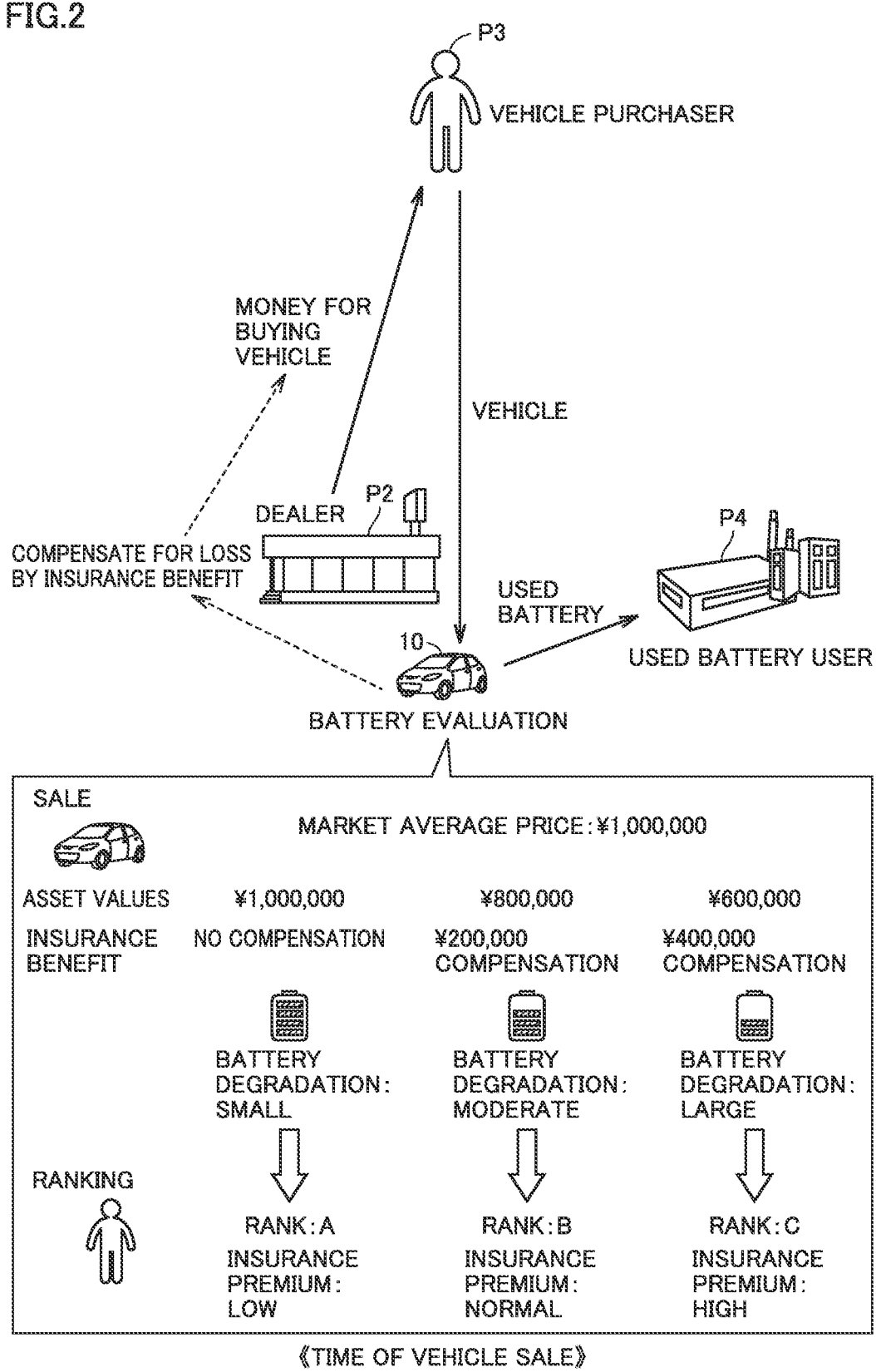
FIG. 2 is a diagram for explaining the operation of the vehicle insurance system when a vehicle subscribed to insurance is sold in the embodiment of the present disclosure.

FIG. 2 is a diagram for explaining the operation of the vehicle insurance system when a vehicle subscribed to insurance is sold in this embodiment.

Referring to FIG. 2, dealer P2 performs buying of vehicle in addition to selling of the vehicle. The vehicle purchaser P3 can sell the vehicle 10 purchased from the dealer P2 to the dealer P2. The vehicle purchaser P3 can receive the above-described insurance service by selling the vehicle 10 subscribed to the insurance to the dealer P2 within the period to be insured.

Specifically, the dealer P2 performs a performance evaluation test on a battery (more specifically, a secondary battery that stores electric power for driving) taken out from the vehicle 10, and evaluates an asset value of the battery. The dealer P2 calculates an asset price (an assessment price) of the battery based on the result of the performance evaluation test. The greater the degree of degradation of the battery, the lower the asset price of the battery. The sales price of the vehicle 10 (corresponding to the asset price of the vehicle 10) changes according to the asset price of the battery. The content of the insurance service received by the vehicle purchaser P3 varies depending on the asset price of the battery when the vehicle 10 is sold. Hereinafter, with reference to FIG. 2, three examples will be described in which the sales price (an assessment price) of the vehicle 10 is different. In the following three examples, it is assumed that the difference in sales price of the vehicle 10 is caused by the difference in asset price of the battery. Here, the market average price (For example, an average price in a market for a used vehicle of the same type as the vehicle 10) of the vehicle 10 is 1,000,000 yen.

In the first example, the degree of degradation of the battery is small, and the asset price of the vehicle 10 is 1,000,000 yen which is the same as the market average price. In this case, since the asset value of the battery is not lost due to degradation, the insurance benefit is not paid to the vehicle purchaser P3. However, the vehicle purchaser P3 is ranked to rank A.

The vehicle purchaser P3 is ranked according to the asset price of the battery when the vehicle 10 is sold. In this embodiment, the vehicle purchaser P3 is ranked to any of ranks A to C. The ranks A to C are insurance ranks used when determining an insurance premium. The higher the insurance rank is, the lower the insurance premium becomes. The insurance rank is in the order of rank A, rank B, and rank C from the highest. The vehicle purchaser P3 of rank A can add the vehicle to the insurance with an insurance premium lower than the normal fee when the vehicle is purchased next time. By reducing the insurance fee of the user who did not degrade the battery, the user can be prompted not to degrade the battery.

In the second example, the degree of degradation of the battery is moderate, and the asset price of the vehicle 10 is 800,000 yen, which is lower than the market average price. In this case, since it is considered that a loss of 200,000 yen has occurred due to degradation of the battery, the loss (200,000 yen) is compensated by insurance benefit. The vehicle purchaser P3 is ranked to rank B. Thus, the insurance premium when the vehicle is purchased next time becomes the normal fee.

In the third example, the degradation degree of the battery is large, and the asset price of the vehicle 10 is 600,000 yen, which is lower than the market average price. In this case, since it is considered that the loss of 400,000 yen has occurred due to the degradation of the battery, the loss (400,000 yen) is compensated by the insurance benefit. The vehicle purchaser P3 is ranked to rank C. Accordingly, the insurance premium when the vehicle is purchased next time becomes higher than the normal fee.

According to the insurance service, when the battery is greatly degraded due to the use of the vehicle 10, the loss of the asset value of the battery can be compensated by the insurance benefit. Therefore, in any of the first to third examples, the vehicle purchaser P3 can sell the vehicle 10 to the dealer P2 at the market average price.

The dealer P2 pays money for buying the vehicle to the vehicle purchaser P3 and buys the vehicle 10 from the vehicle purchaser P3. If the degree of degradation of the battery of the bought vehicle 10 is small, the dealer P2 may sell or lease the vehicle 10 as a used vehicle without replacing the battery. When the degree of degradation of the battery of the bought vehicle 10 is moderate, the dealer P2 may sell or lease the battery taken out from the vehicle 10 to the used battery user P4. The batteries taken out from the vehicle 10 may be reused for stationary. When the degree of degradation of the battery of the bought vehicle 10 is large, the dealer P2 may transfer the battery taken out from the vehicle 10 to the resource recycling. In resource recycling, the battery is disassembled to a material level to recover renewable material from the battery. If the battery degrades to a level that cannot be reused as a used battery, the economical value of the battery becomes significantly low.

Figure 3:
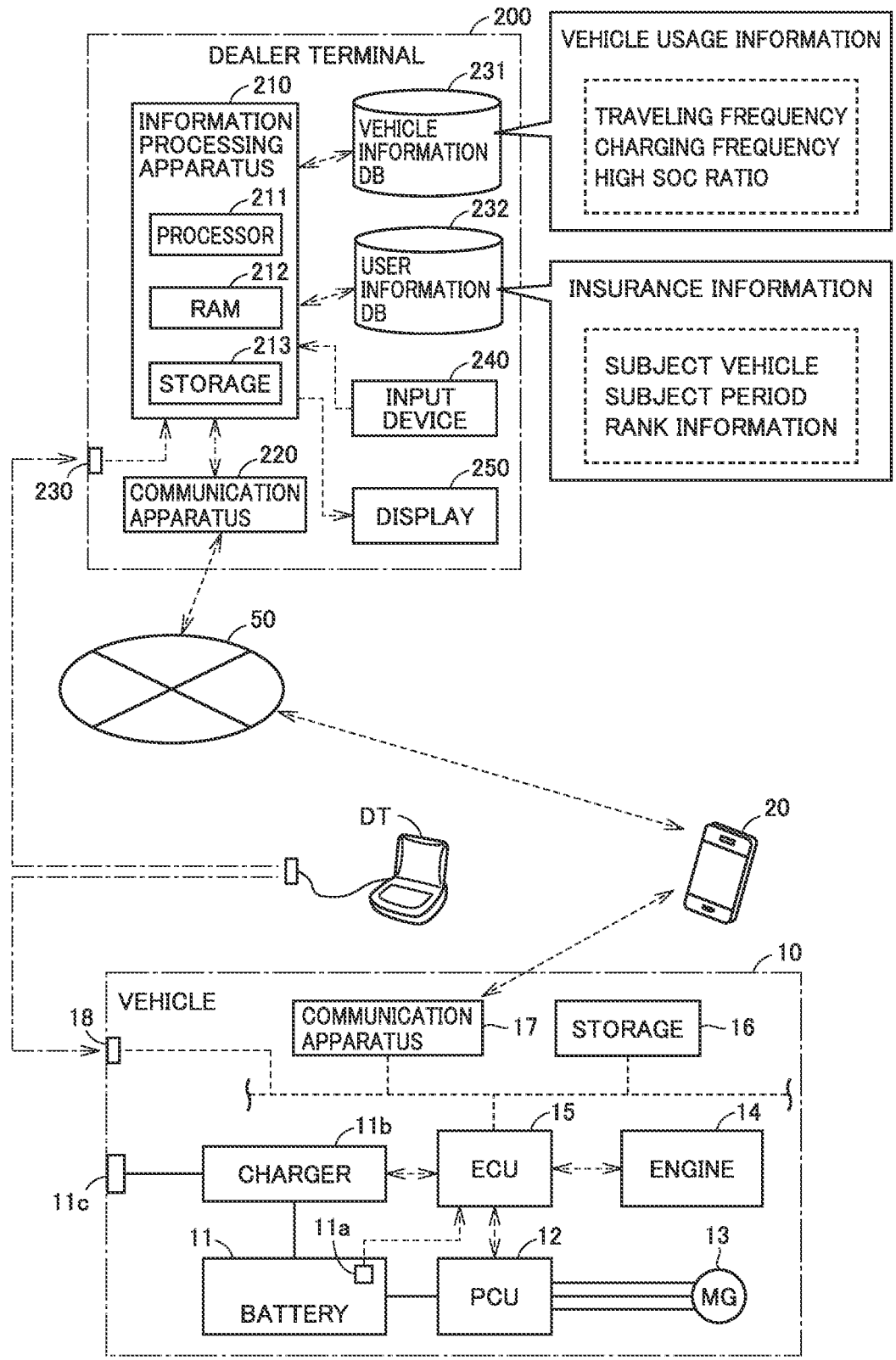
FIG. 3 is a diagram showing a detailed configuration of a vehicle and a dealer terminal included in the vehicle insurance system according to the embodiment of the present disclosure.

FIG. 3 is a diagram showing a detailed configuration of the vehicle 10 and the dealer terminal 200 included in the vehicle insurance system according to the present embodiment.

As described above with reference to FIGS. 1 and 2 and FIG. 3, the vehicle 10 is a PHEV. The vehicle 10 is sold by a dealer P2. The vehicle purchaser P3 becomes a user of the vehicle 10 by purchasing the vehicle 10. The vehicle 10 includes a battery 11, a monitoring unit 11a, a power control unit (PCU) 12, a motor generator (MG) 13, an engine 14, an electronic control unit (ECU) 15, a storage 16, a communication apparatus 17, and a connector 18 for connecting the dealer tool DT.

The battery 11 includes a secondary battery such as a lithium ion battery or a nickel metal hydride battery. The secondary battery may be an assembled battery. In this embodiment, an assembled battery including a plurality of lithium ion batteries is employed as the secondary battery. The assembled battery is configured by electrically connecting a plurality of secondary batteries (also generally referred to as "cells") to each other. The battery 11 according to this embodiment corresponds to an example of the "power storage device" according to the present disclosure.

The monitoring unit 11a includes various sensors for detecting the state of the battery 11 (e.g., temperature, current, and voltage), and outputs the detection result to the ECU 15. The ECU 15 acquires the state of the battery 11 based on the output of the monitoring unit 11a (detected values of various sensors). The monitoring unit 11a, in addition to the sensor function SOC (State Of Charge) estimation function, a SOH (State of Health) estimation function, the cell voltage equalizing function, the diagnostic function, and a communication function may be further includes a BMS (Battery Management System).

The ECU 15 may be a microcomputer. The ECU 15 includes a processor and a RAM (Random Access Memory). The storage 16 is configured to be able to store the stored information. For example, the control of the vehicle 10 is executed by executing a program stored in the storage 16 by the processor of the ECU 15. Although not shown, in addition to the monitoring unit 11a, various sensors (such as a vehicle speed sensor, an odometer, an accelerator opening degree sensor, and an outside air temperature sensor) are mounted on the vehicle 10. The ECU 15 detects the state of the vehicle 10 by a sensor mounted on the vehicle 10, and accumulates the detection result in the storage 16. For example, whether the vehicle 10 is in the traveling state, the charging state, or the inactive state is sequentially recorded in the storage 16. The traveling state is a state in which the vehicle 10 is traveling. The charging state is a state in which the vehicle 10 is being externally charged. The inactive state is a state in which external charging is not performed during parking of the vehicle 10 (a state in which the vehicle 10 is not in the traveling state or the charging state). The transition of SOC of the battery 11 is also sequentially recorded in the storage 16. The ECU 15 controls the in-vehicle equipment such that the vehicle 10 is in a desired state based on the detection result of the in-vehicle sensor.

The communication apparatus 17 includes various communication I/Fs (interfaces). In this embodiment, the communication apparatus 17 is configured to be capable of communicating with the mobile terminal 20. The communication between the communication apparatus 17 and the mobile terminal 20 may be short-range communication (e.g., direct communication within a vehicle and in a range around the vehicle) such as Bluetooth (registered trademark).

The mobile terminal 20 is a terminal carried by a user of the vehicle 10. In this embodiment, a smartphone having a touch panel display is employed as the mobile terminal 20. However, the mobile terminal 20 is not limited thereto, and any mobile terminal may be employed. A tablet terminal, a wearable device (e.g., a smart watch), an electronic key, or the like may be employed. The mobile terminal 20 is configured to be able to access the communication network 50 by wireless communication.

The MG 13 is, for example, a three-phase AC motor generator. The MG 13 is driven by the PCU 12 and is configured to rotate the drive wheels of the vehicle 10. The PCU 12 includes, for example, an inverter and a converter (both not shown). The PCU 12 drives the MG 13 using electric power supplied from the battery 11. The power stored in the battery 11 is converted into power by the MG 13. The MG 13 performs regenerative power generation and supplies the generated power to the battery 11. The PCU 12 is controlled by the ECU 15. The engine 14 is an internal combustion engine that outputs power by converting combustion energy generated when fuel is burned into kinetic energy of a moving element such as a piston or a rotor. The engine 14 is controlled by the ECU 15.

Each of MG 13 and engine 14 is configured to transmit power to driving wheels of vehicle 10. The ECU 15 is configured to drive the vehicle 10 using power output from at least one of the MG 13 and the engine 14 by performing cooperative control of the PCU 12 and the engine 14. The hybrid system of the vehicle 10 may be any of a series system, a parallel system, and a split system.

The ECU 15 selects one travel mode from a plurality of types of travel modes, and controls the travel of the vehicle 10 in accordance with the selected travel mode. The user can operate an input device (not shown) (e.g., a switch provided near the driver's seat) or the mobile terminal 20 to instruct the ECU 15 to switch the traveling mode. The ECU 15 selects the traveling mode instructed by the user.

The plurality of types of traveling modes include a CD (Charge Deleting) mode and a CS (Charge Sustaining) mode. The CD mode is a traveling mode in which the MG 13 continuously drives the vehicle 10 while consuming the electric power of the battery 11 in a state in which the engine 14 is stopped. In the CD mode, the rate of discharge is larger than the rate of charge of the battery 11, and the SOC of the battery 11 gradually decreases. The CS mode is a traveling mode in which the engine 14 is turned on or off so that the SOC of the battery 11 is maintained at the target SOC value. The target SOC value may be about 50%.

The vehicle 10 further includes a charger 11b and an inlet 11c for contact charging. The connector of the charging cable connected to the main body of EVSE (Electric Vehicle Supply Equipment) (not shown) is connected to the inlet 11c of the vehicle 10 (plugged-in) in the parked state, whereby the vehicle 10 enters the plug-in state. The EVSE corresponds to a power supply facility outside the vehicle. In the plug-in state, communication can be performed between the vehicle 10 and the EVSE, and electric power can be transmitted and received between the EVSE and the vehicle 10. In the vehicle 10 in the plug-in state, external charging (That is, charging of the battery 11 by the power supplied from the EVSE to the inlet 11c.) is enabled. During external charging, the charger 11b converts the power received by the inlet 11c into power suitable for charging the battery 11, and outputs the converted power to the battery 11. The charger 11b is controlled by the ECU 15.

The ECU 15 is configured to be capable of executing both immediate charging and timer charging. The immediate charge is an external charge that is started immediately when the vehicle 10 enters the plug-in state. The timer charging is external charging executed in accordance with a preset schedule. The timer charging schedule may include both a start time and an end time. Further, the timer charging schedule is only the start time, and the timer charging may be started at the start time, and the timer charging may be terminated when the SOC of the battery 11 becomes equal to or higher than a predetermined SOC value during charging. By operating an input device (not shown) (e.g., an operation panel provided in the vicinity of the driver's seat) or the mobile terminal 20, the user can set a timer charging schedule for the ECU 15 and switch between reservation and cancellation of timer charging. The ECU 15 executes immediate charging when timer charging is not reserved, and executes timer charging according to a preset schedule without executing immediate charging when timer charging is reserved.

The connector 18 is configured to be connectable to the dealer tool DT. By connecting the communication cable of the dealer tool DT to the connector 18, the dealer tool DT can acquire data stored in the vehicle 10 (for example, data stored in the storage 16) from the vehicle 10.

The dealer terminal 200 is a terminal installed in the dealer P2 shown in FIGS. 1 and 2. The dealer terminal 200 includes an information processing apparatus 210, a communication apparatus 220, a connector 230 for connecting a dealer tool DT, a vehicle information DB (database) 231, a user information DB (database) 232, an input device 240, and a display 250.

The information processing apparatus 210 may be a computer. The information processing apparatus 210 includes a processor 211, a RAM 212, and a storage 213. As the processor 211, for example, a CPU (Central Processing Unit) can be employed. The storage 213 is configured to be able to store the inputted information. The storage 213 stores, in addition to programs, information (e.g., maps, mathematical expressions, and various parameters) used in the programs. The number of processors included in the information processing apparatus 210 is arbitrary, and processors may be prepared for each predetermined process. In this embodiment, the information processing apparatus 210 performs processing by software, but processing may be performed by dedicated hardware (electronic circuit) instead of software.

The communication apparatus 220 is configured to be accessible to the communication network 50. The communication apparatus 220 is configured to be capable of communicating with an external communication apparatus (including the mobile terminal 20) via the communication network 50. The signal exchanged between the communication apparatus 220 and the mobile terminal 20 may be encrypted. The connector 230 is configured to be connectable to the dealer tool DT. By connecting the communication cable of the dealer tool DT to the connector 230, data held by the dealer tool DT (e.g., data fetched from the vehicle 10) can be transmitted from the dealer tool DT to the dealer terminal 200. The information processing apparatus 210 of the dealer terminal 200 adds the information acquired from the dealer tool DT to the vehicle information DB 231 and the user information DB 232.

The input device 240 is a device that accepts an input from a user. The input device 240 is configured to output a signal corresponding to an input from the user to the information processing apparatus 210. As the input device 240, various pointing devices (such as a mouse and a touch pad), a keyboard, or a touch panel can be employed. The input device 240 may include a smart speaker for receiving audio input. The display 250 is configured to display information in accordance with an instruction from the information processing apparatus 210. The display 250 may be a liquid crystal display (LCD) or a touch panel display. The display 250 may comprise a speaker function.

The dealer P2 assigns an ID for identifying each vehicle sold (hereinafter, also referred to as a "vehicle ID"). The vehicle sold by the dealer P2 is registered in the vehicle information DB 231. The vehicle information DB 231 stores vehicle information related to each registered vehicle in association with a vehicle ID of each registered vehicle. The vehicle information stored in the vehicle information DB 231 includes initial capacity of the power storage device and vehicle usage information. The vehicle information input to the information processing apparatus 210 through the input device 240 may be added to the vehicle information DB 231. The vehicle usage information is information on how to use the vehicle. In this embodiment, the traveling frequency (the number of vehicle trips per unit period), the charging frequency (the number of charging operations of a vehicle-mounted power storage device per unit period), the high SOC ratio (a ratio of a time for which an SOC of a vehicle-mounted power storage device is a predetermined value or more to an inactive period), and the test result at the time of selling the vehicle (the result of the performance evaluation test of the power storage device) are employed as the vehicle usage information. Details of the traveling frequency, the charging frequency, the high SOC ratio, and the test result at the time of selling the vehicle will be described later. The information processing apparatus 210 can identify a vehicle based on the vehicle ID and read out vehicle information related to the vehicle from the vehicle information DB 231.

The dealer P2 assigns an ID (hereinafter, also referred to as "user ID") for identifying the user to each of the traded users. The user who has traded the vehicle by the dealer P2 is registered in the user information DB 232. The user information DB 232 stores user information related to each registered user in association with a user ID of each user. The user information stored in the user information DB 232 includes contact information (e.g., communication address) of the user and insurance information. The user information input to the information processing apparatus 210 through the input device 240 may be added to the user information DB 232. In this embodiment, a subject vehicle (a vehicle to be insured), a subject period (a period to be insured), and rank information (information indicating an insurance rank of a user) are employed as insurance information. The information processing apparatus 210 can identify a user based on the user ID and read user information related to the user from the user information DB 232.

Figures 4, 5:
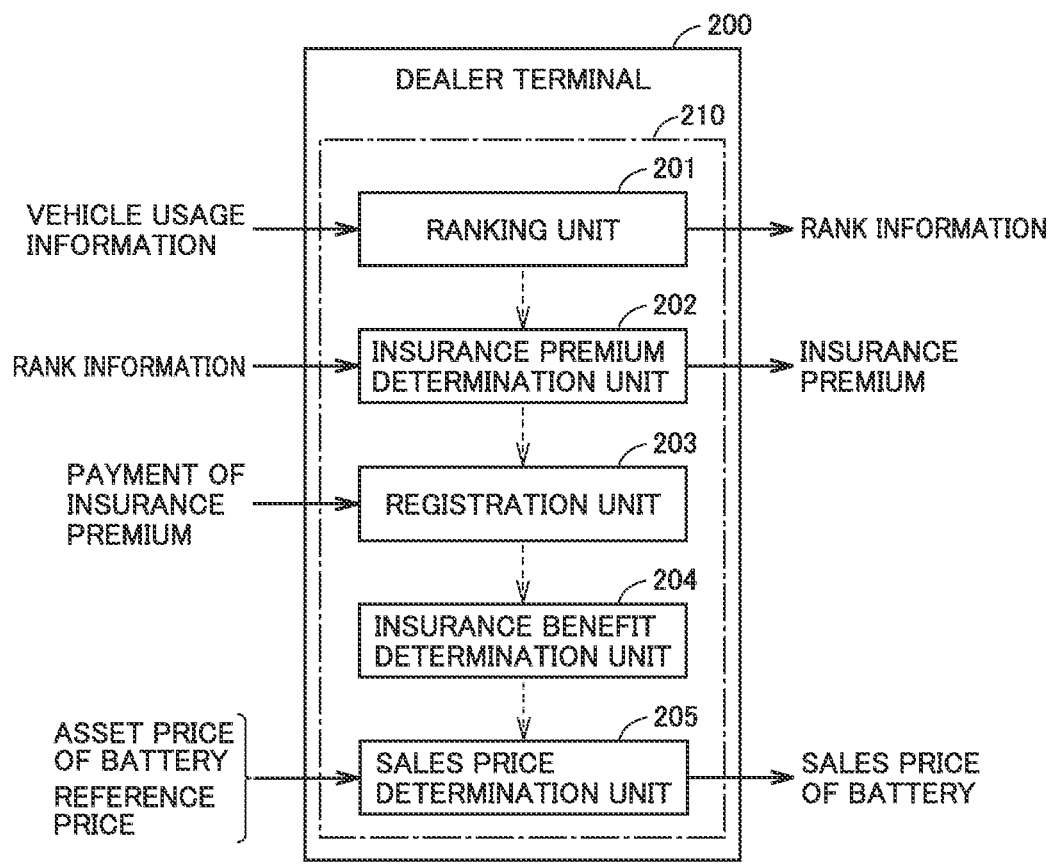
FIG. 4 is a diagram showing an example of user information stored in a user information database shown in FIG. 3.
FIG. 5 is a functional block diagram showing components of the dealer terminal shown in FIG. 3 for each function.

FIG. 4 is a diagram showing an example of user information stored in the user information DB 232. Referring to FIG. 4 together with FIG. 3, in the user information DB 232, insurance information for each user is managed. The insurance information for each user is distinguished by the user ID. The subject vehicle is a vehicle subscribed to insurance. In this embodiment, the vehicle subscribed to the insurance among the vehicles sold by the dealer P2 is registered as the subject vehicle in the user information DB 232. Therefore, the subject vehicle is one of the registered vehicles. The subject vehicle may be indicated by a vehicle ID. The subject period indicates a period during which insurance is applied. For example, a period from when the subject vehicle is sold until a predetermined time (for example, one year) elapses is registered as the subject period in the user information DB 232. The subject period is renewed (extended) by the renewal of the insurance contract. The rank indicates the user's insurance rank and is renewed at any time. The insurance rank is any one of the ranks A to C described above.

FIG. 5 is a functional block diagram showing components of the dealer terminal 200 for each function. Referring to FIG. 5 together with FIG. 3, the information processing apparatus 210 of the dealer terminal 200 includes a ranking unit 201, an insurance premium determination unit 202, a registration unit 203, an insurance benefit determination unit 204, and a sales price determination unit 205. In this embodiment, each unit is embodied by the processor 211 shown in FIG. 3 and a program executed by the processor 211 (e.g., a program stored in the storage 213). This is not exclusive, however, each of the above-described units may be embodied by dedicated hardware (electronic circuit).

The ranking unit 201 is configured to rank the purchaser using the vehicle usage information of the purchaser of the subject vehicle. The insurance premium determination unit 202 is configured to determine the initial insurance fee using the rank of the purchaser. In this embodiment, the insurance premium determination unit 202 is configured to determine not only the initial insurance fee (initial insurance premium) but also the renewal fee (insurance renewal premium) using the rank of the purchaser. The registration unit 203 is configured to register the subject vehicle and the subject period when the initial insurance fee (insurance premium for the subject period) is paid when the subject vehicle is sold. The insurance benefit determination unit 204 is configured to determine an insurance benefit that compensates for at least a portion of the loss of asset value due to degradation of the power storage device when the subject vehicle is sold within the subject period. The sales price determination unit 205 is configured to determine the sales price of the power storage device using the asset price and the reference price of the power storage device. In the configuration that the subject vehicle is the vehicle 10, the battery 11 corresponds to the "power storage device".

Hereinafter, the operation of the dealer terminal 200 in an example in which the user replaces the first vehicle with the second vehicle will be described with reference to FIGS. 5 and 6. In this example, the user does not subscribe to the above-described insurance for the first vehicle, and subscribes to the above-described insurance for the second vehicle. The first vehicle is not registered in the user information DB 232, and the second vehicle is registered in the user information DB 232 as a subject vehicle. Each of the first vehicle and the second vehicle has the configuration shown in FIG. 3, similarly to the vehicle 10. The batteries 11 of the first vehicle and the second vehicle correspond to examples of the "first power storage device" and the "second power storage device" according to the present disclosure, respectively.

The dealer P2 buys the first vehicle from the user. When the user sells the first vehicle, the dealer terminal 200 executes the process shown in FIG. 6 described below for the first vehicle. FIG. 6 is a flowchart showing a process executed by the dealer terminal 200 when the user sells the vehicle to the dealer P2. The process shown in this flowchart is started, for example, when the employee of the dealer P2 instructs the dealer terminal 200 through the input device 240 (FIG. 3). Hereinafter, each step in the flowchart is simply referred to as "S".

Figure 6:
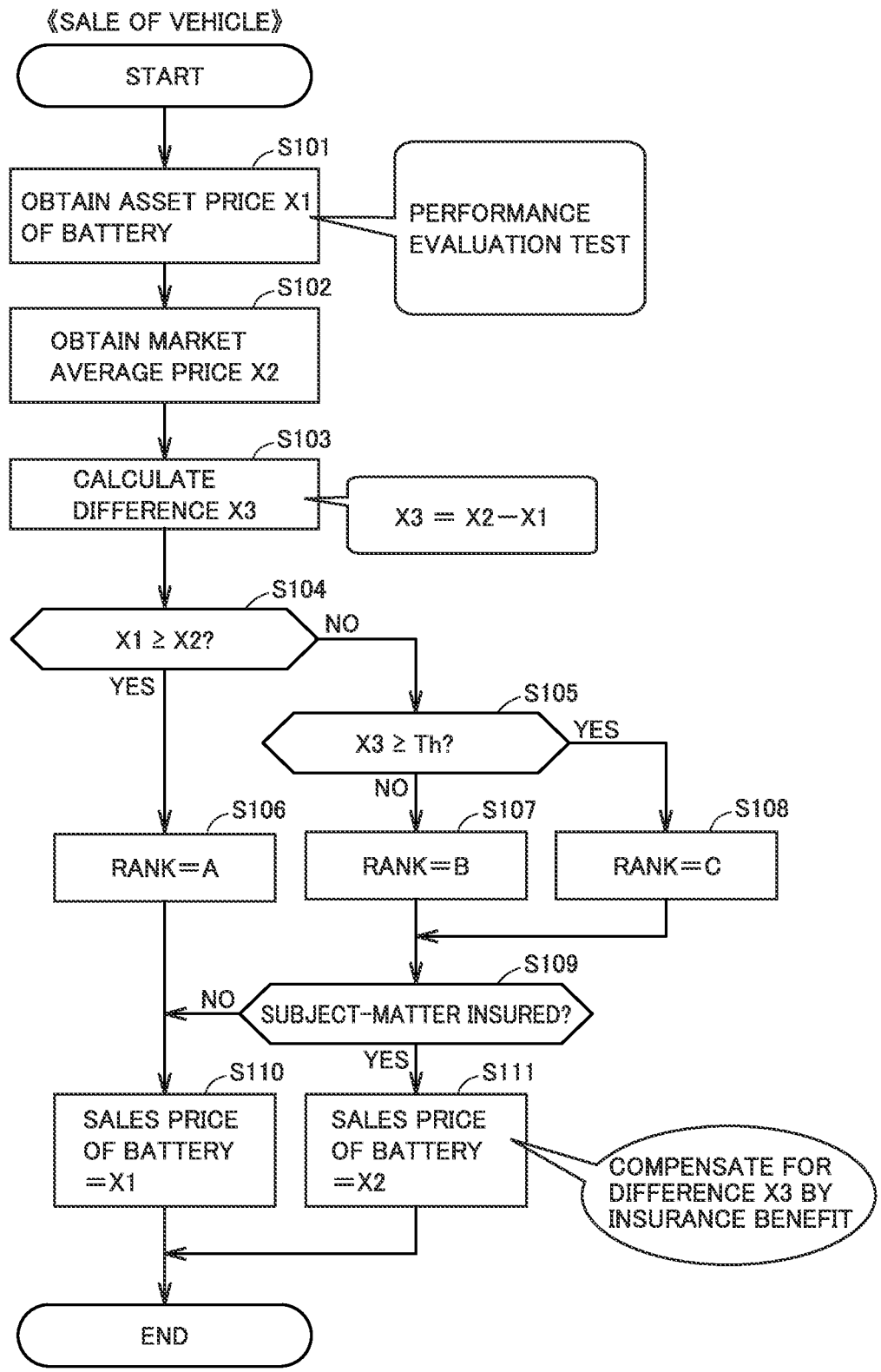
FIG. 6 is a flowchart showing a process executed by a dealer terminal when a user sells a vehicle to a dealer in the vehicle insurance system according to the embodiment of the present disclosure.

Referring to FIG. 6 together with FIGS. 3 and 5, in S101, the sales price determination unit 205 acquires the asset price of the battery 11. Specifically, in the dealer P2, the operator performs a performance evaluation test on the battery 11 taken out from the first vehicle, and inputs a test result (a result of the performance evaluation test) to the dealer terminal 200. The sales price determination unit 205 acquires the input test result. Then, the sales price determination unit 205 calculates the asset price of the battery 11 (hereinafter referred to as "price X1") using the test result.

The performance evaluation test is a test for evaluating the asset value of the battery 11. In this embodiment, a test for measuring the capacity retention ratio of the battery 11 is employed as the performance evaluation test. The capacity retention ratio is the ratio of the current capacity to the initial capacity. The initial capacity is a capacity in an initial state (that is, a state in which the power storage device is not degraded). As the capacity retention ratio of the battery 11 is lower, degradation of the battery 11 progresses. In S101, the sales price determination unit 205 calculates the price X1 such that the price X1 increases as the capacity retention ratio of the battery 11 indicated by the test result increases. The test result in this embodiment corresponds to an example of the "information on the capacity retention ratio of the power storage device mounted on the vehicle" according to the present disclosure.

Subsequently, in S102, the sales price determination unit 205 acquires a reference price (hereinafter, referred to as "price X2"). The price X2 may be a market average price (For example, an average price in a market for a used battery of the same type as the battery 11) of the battery 11. The sales price determination unit 205 may acquire the price X2 from a predetermined database (for example, a database owned by an external data center) through the communication apparatus 220.

Subsequently, in S103, the sales price determination unit 205 calculates the difference X3 (=X2−X1) by subtracting the price X1 from the price X2. In S104, the ranking unit 201 determines whether or not the price X1 is greater than or equal to the price X2. When the price X1 is less than the price X2 (NO in S104), the ranking unit 201 determines whether or not the difference X3 is equal to or greater than a predetermined threshold value (hereinafter referred to as "Th") in S105.

If the price X1 is greater than or equal to the price X2 (YES in S104), the ranking unit 201 determines that the degree of degradation of the battery 11 is small, and the process proceeds to S106. When the price X1 is less than the price X2 and the difference X3 is less than Th (NO in S105), the ranking unit 201 recognizes that the degree of degradation of the battery 11 is moderate, and the process proceeds to S107. When the price X1 is less than the price X2 and the difference X3 is equal to or greater than Th (YES in S105), the ranking unit 201 recognizes that the degree of degradation of the battery 11 is large, and the process proceeds to S108. In S106, S107, and S108, the ranking unit 201 sets the user's insurance ranks to ranks A, B, and C, respectively. The ranking unit 201 updates the rank information in the user information DB 232 in each of S106 to S108. The user's insurance rank determined in any of S106 to S108 is associated with the user ID and stored in the user information DB 232 (see FIG. 4).

Since the first vehicle has not subscribed to the insurance, when ranking is performed in any one of S106 to S108, the process of S110 is executed. Specifically, when the process of S106 is executed, the process proceeds to S110, and when either of S107 and S108 is executed, the process proceeds to S109. In S109, the sales price determination unit 205 determines whether or not the first vehicle is the subject-matter insured. Since the first vehicle has not subscribed to insurance, NO is determined in S109, and the process proceeds to S110.

In S110, the sales price determination unit 205 sets the price X1 calculated in S101 (the asset price of the battery 11 in the first vehicle) as the sales price of the battery 11 in the first vehicle. The sales price determination unit 205 may notify the mobile terminal 20 carried by the user of the first vehicle of the sales price of the first vehicle (including the battery 11). The user of the first vehicle may operate the mobile terminal 20 to sell the first vehicle by cashless payment. When the process of S110 is executed, the series of processes shown in FIG. 6 ends. S111 of FIG. 6 will be described in a process when the second vehicle is sold, which will be described later.

Figure 7:
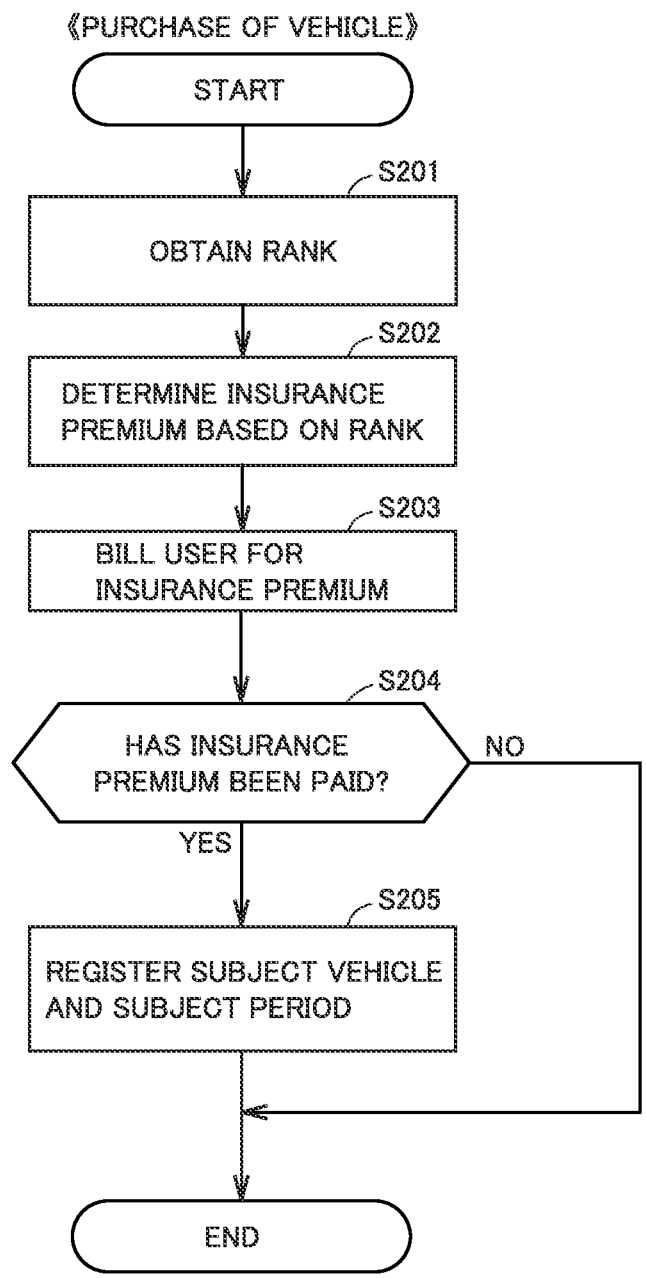
FIG. 7 is a flowchart showing a process executed by a dealer terminal when a user purchases a vehicle from a dealer in the vehicle insurance system according to the embodiment of the present disclosure.

Next, the dealer P2 sells the second vehicle to the user who has sold the first vehicle. When the user purchases the second vehicle, the dealer terminal 200 executes the process shown in FIG. 7 described below for the second vehicle. FIG. 7 is a flowchart showing a process executed by the dealer terminal 200 when the user purchases a vehicle from the dealer P2. The process shown in this flowchart is started, for example, when the employee of the dealer P2 instructs the dealer terminal 200 through the input device 240 (FIG. 3).

Referring to FIGS. 3 and 5 and FIG. 7, in S201, the insurance premium determination unit 202 acquires the insurance rank of the user (the purchaser of the second vehicle) from the user information DB 232. Subsequently, in S202, the insurance premium determination unit 202 determines an initial insurance fee (insurance premium for the subject period) based on the insurance rank of the user. The insurance premium determination unit 202 may determine the initial insurance fee by referring to the fee table stored in the storage 213.

FIG. 8 is a diagram showing an example of a fee table. Referring to FIG. 8, the initial insurance fee is an insurance premium for causing the vehicle to subscribe to the insurance. The user may receive an insurance service for the vehicle by paying for the initial insurance fee when the vehicle is purchased. However, the period during which the insurance service is received by the initial insurance fee is limited to the subject period of the initial insurance fee. In this embodiment, a period from when the initial insurance fee is paid to when one year has elapsed is defined as a subject period. In the fee table shown in FIG. 8, the initial insurance fee changes depending on the insurance rank of the user (vehicle purchaser). When the user's insurance ranks are ranks A, B, and C, the initial insurance fees are 10,000 yen, 20,000 yen, and 30,000 yen, respectively. Thus, the higher the user's insurance rank is, the lower the initial insurance fee becomes. The renewal fee will be described later.

As described above, the ranking unit 201 according to this embodiment increases the insurance rank of the user as the asset price of the battery 11 of the first vehicle indicated by the result of the performance evaluation test when the user (the purchaser of the second vehicle) sells the first vehicle is higher (see S101 to S108 of FIG. 6). The higher the user's usage of the first vehicle is, the higher the user's insurance rank becomes. In this embodiment, as shown in FIG. 8, the initial insurance fee increases as the user's insurance rank decreases. In this way, by increasing the insurance premium of the user who uses the vehicle to promote degradation of the power storage device, it is possible to suppress such an increase in the user.

Referring again to FIGS. 3 and 5 and FIG. 7, in S203, the registration unit 203 bills the user for the initial insurance fee determined in S202. The registration unit 203 may notify the mobile terminal 20 carried by the user of the first vehicle of the initial insurance fee. Upon receipt of the notification from the dealer terminal 200, the mobile terminal 20 may display a screen shown in FIG. 9 described below.

FIG. 9 is a diagram showing an example of a screen on which the dealer terminal 200 bills a user for an insurance premium. Referring to FIG. 9, this screen displays messages M11 and M12, a "YES" button M13, and a "NO" button M14 to prompt the user to select whether or not to pay an insurance premium. Message M11 shows an overview of insurance (including an initial insurance fee and a subject period). Message M12 shows an explanation about "YES" button M13 and "NO" button M14. The user can select one of the "YES" button M13 and the "NO" button M14 by touching the screen, for example. By operating the "Yes" button M13, the user can pay the initial insurance fee to the dealer P2 by the cacheless payment. Each button is not limited to a virtual button displayed on the touch panel display, and may be a physical button.

Referring again to FIGS. 3 and 5 and FIG. 7, in S204, the registration unit 203 determines whether or not the initial insurance fee has been paid by the user. When the user selects the "YES" button M13 (FIG. 9), the registration unit 203 determines YES in S204. If the user selects the "NO" button M14 (FIG. 9), the registration unit 203 determines NO in S204.

In this embodiment, the user (the purchaser of the second vehicle) pays the initial insurance fee to subscribe to the insurance of the second vehicle. Therefore, YES is determined in S204, and the process proceeds to S205. In S205, the registration unit 203 registers the subject vehicle (second vehicle) and the subject period of the initial insurance fee in the user information DB 232. As a result, an insurance contract is established, and the second vehicle subscribes to the insurance. The subject vehicle and the subject period are associated with the user ID and stored in the user information DB 232 (see FIG. 4). When the initial insurance fee is not paid by the user (NO in S204), the series of processes shown in FIG. 7 is ended without registering the subject vehicle and the subject period. In this case, the purchased vehicle does not subscribe to the insurance.

Figure 10:
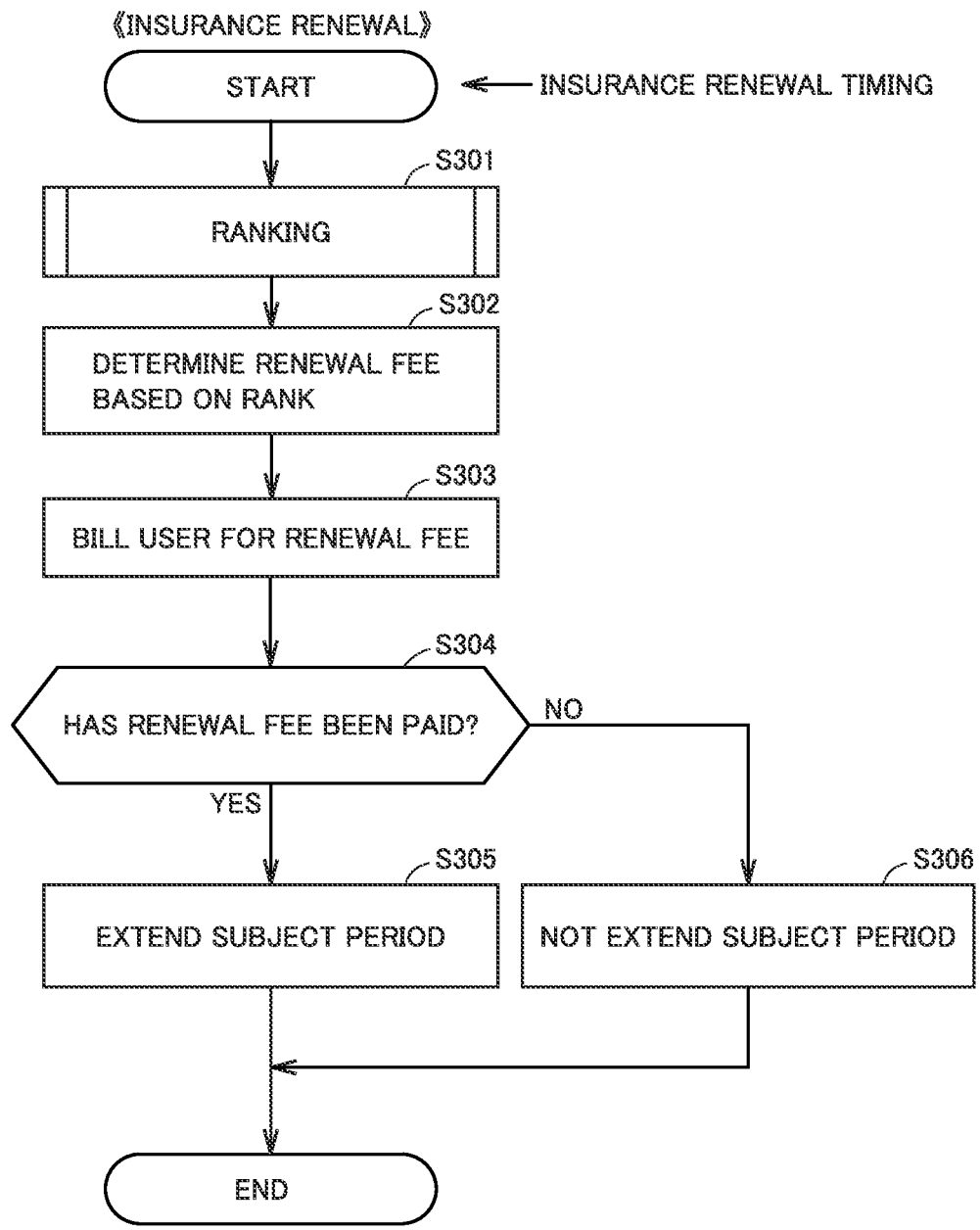
FIG. 10 is a flowchart showing an insurance renewal process executed by the dealer terminal in the vehicle insurance system according to the embodiment of the present disclosure.

When the process of S205 is executed, the series of processes shown in FIG. 7 ends. Thereafter, when the expiration of the subject period of the initial insurance fee paid for the second vehicle approaches, the dealer terminal 200 executes the process shown in FIG. 10 described below for the second vehicle. FIG. 10 is a flowchart showing an insurance renewal process executed by the dealer terminal 200. The processing shown in this flowchart is executed at the insurance renewal timing.

In this embodiment, when the expiration of the subject period is approached, the dealer terminal 200 notifies the mobile terminal 20 carried by the user of the second vehicle to prompt the user to visit. When the second vehicle visits the dealer P2 at a time close to the expiration of the subject period (for example, between one month before the expiration of the subject period and the expiration of the subject period), the employee of the dealer P2 uses the dealer tool DT to take in the vehicle usage information accumulated in the second vehicle into the dealer terminal 200, and then causes the dealer terminal 200 to execute the process shown in FIG. 10. The vehicle usage information fetched by the dealer terminal 200 is stored in the vehicle information DB 231.

Referring to FIG. 10 together with FIGS. 3 and 5, in S301, the ranking unit 201 ranks the user using the vehicle usage information of the user (the purchaser of the second vehicle). Then, the ranking unit 201 updates the rank information in the user information DB 232 based on the ranking result. Hereinafter, the process (ranking) of S301 will be described in detail with reference to FIGS. 11 to 16.

Figure 11:
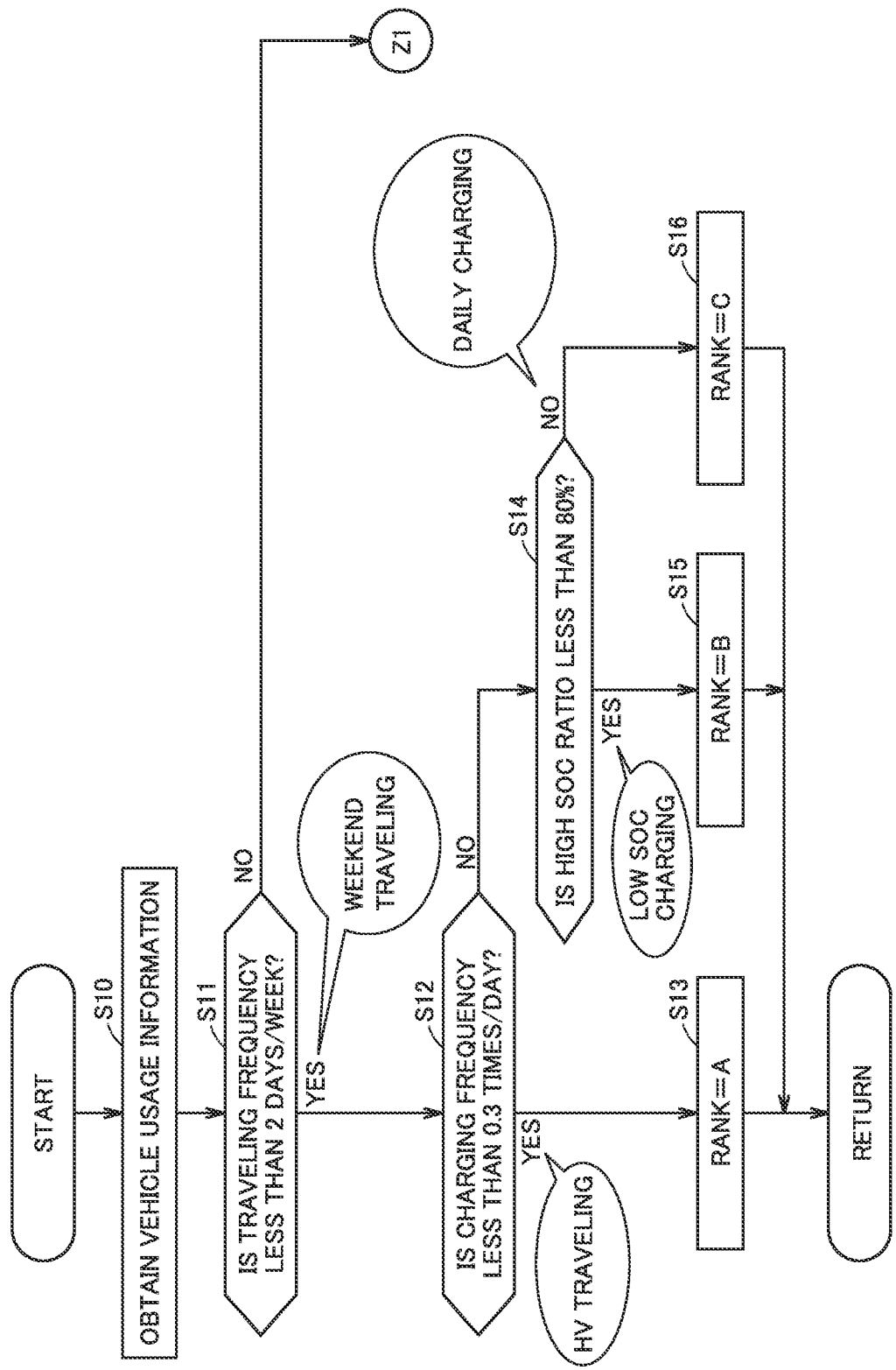
FIG. 11 is a first flowchart showing a ranking process shown in FIG. 10.

FIG. 11 is a first flowchart showing ranking processing executed in S301 of FIG. 10. Referring to FIGS. 3 and 5 and FIG. 11, in S10, the ranking unit 201 acquires the vehicle usage information of the user (the purchaser of the second vehicle) from the vehicle information DB 231. Then, the ranking unit 201 calculates the traveling frequency, the charging frequency, and the high SOC ratio of the user based on the vehicle usage information. In this embodiment, the number of driving days of the second vehicle per week is employed as the traveling frequency. The number of times of external charging of the battery 11 per day is employed as the charging frequency. Further, the ratio of the time during which the SOC of the battery 11 is 70% or more in the inactive period (the period during which the second vehicle is left) is employed as the high SOC ratio. In this embodiment, the ranking unit 201 calculates the traveling frequency, the charging frequency, and the high SOC ratio using data (vehicle usage information) from the time of purchase of the second vehicle to the current time. However, the ranking unit 201 may calculate the traveling frequency, the charging frequency, and the high SOC ratio using the data from the last renewal time to the current renewal time (current time point) in the second and subsequent renewals. Each of the traveling frequency, the charging frequency, and the high SOC ratio in this embodiment corresponds to an example of the "information on the capacity retention ratio of the power storage device mounted on the vehicle" according to the present disclosure.

In S11, the ranking unit 201 determines whether or not the user's traveling frequency is less than 2 days/week. When the traveling frequency is less than 2 days/week (YES in S11), the ranking unit 201 recognizes the user's vehicle usage as "weekend traveling", and the process proceeds to S12. The weekend driving is vehicle usage in which a vehicle is driven only at the weekend.

In S12, the ranking unit 201 determines whether or not the user's charging frequency is less than 0.3 times/day. When the charging frequency is less than 0.3 times/day (YES in S12), the ranking unit 201 recognizes the user's vehicle usage as "HV traveling", and sets the user's insurance rank as rank A in S13. HV traveling is a method of using a vehicle actively using the power of the engine 14 for traveling. In this embodiment, if the period during which the CS mode is selected as the traveling mode is lengthened, this corresponds to HV traveling.

When the charging frequency is 0.3 times/day or more (NO in S12), the ranking unit 201 determines whether or not the high SOC ratio of the user is less than 80% in S14. When the high SOC ratio is less than 80% (YES in S14), the ranking unit 201 recognizes the user's vehicle usage as "low SOC charging", and sets the user's insurance rank as rank B in S15. When the high SOC ratio is 80% or more (NO in S14), the ranking unit 201 recognizes the user's vehicle usage as "daily charging", and sets the user's insurance rank as rank C in S16. The low SOC charging is vehicle usage in which external charging of the battery 11 is performed when the user feels that the SOC of the battery 11 is low. The daily charging is vehicle usage in which external charging of the battery 11 is performed once a day.

When the insurance rank of the user (the purchaser of the second vehicle) is updated in any one of S13, S15, and S16, the process shown in FIG. 11 (S301 in FIG. 10) ends, and the process proceeds to S302 in FIG. 10. If NO is determined in S11, the process shown in FIG. 12 described below is started. "Z1" in FIG. 11 corresponds to the start of the process shown in FIG. 12.

Figure 12:
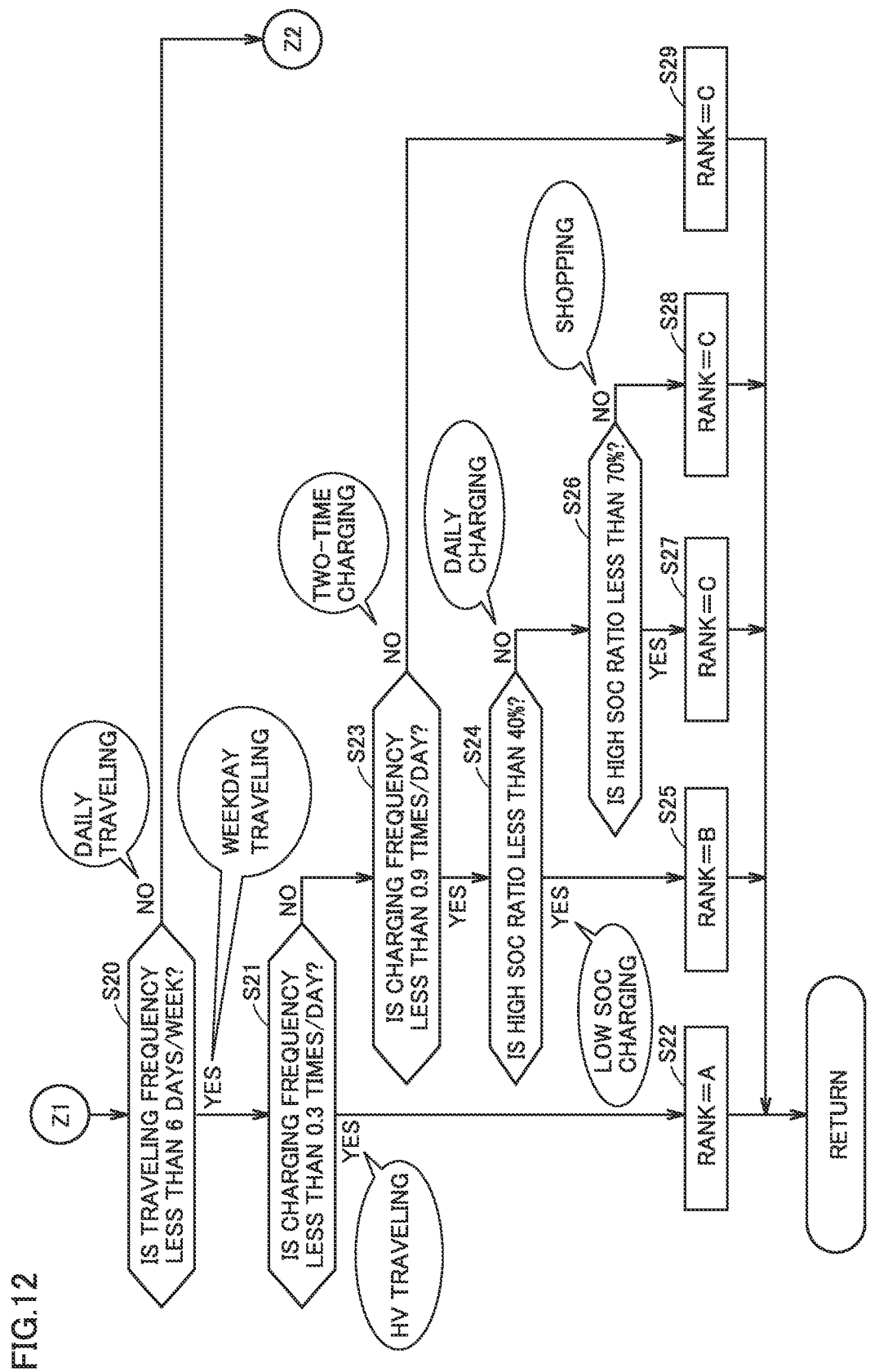
FIG. 12 is a second flowchart showing the ranking process shown in FIG. 10.

FIG. 12 is a second flowchart showing ranking processing executed in S301 of FIG. 10. Referring to FIGS. 3 and 5 and FIG. 12, in S20, the ranking unit 201 determines whether or not the traveling frequency of the user (the purchaser of the second vehicle) is less than 6 days/week. When the traveling frequency is less than 6 days/week (YES in S20), the ranking unit 201 recognizes the user's vehicle usage as "weekday traveling", and the process proceeds to S21. The weekday driving is vehicle usage in which a vehicle is driven only on weekdays.

In S21, the ranking unit 201 determines whether or not the user's charging frequency is less than 0.3 times/day. When the charging frequency is less than 0.3 times/day (YES in S21), the ranking unit 201 recognizes the user's vehicle usage as "HV traveling", and sets the user's insurance rank as rank A in S22.

When the charging frequency is 0.3 times/day or more (NO in S21), the ranking unit 201 determines whether or not the charging frequency is less than 0.9 times/day in S23. When the charging frequency is less than 0.9 times/day (YES in S23), the ranking unit 201 determines whether or not the high SOC ratio of the user is less than 40% in S24.

If the high SOC ratio is less than 40% (YES in S24), the ranking unit 201 recognizes the user's vehicle usage as "low SOC charging", and sets the user's insurance rank as rank B in S25.

When the high SOC ratio is 40% or more (NO in S24), the ranking unit 201 recognizes the user's vehicle usage as "daily charging", and the process proceeds to S26. In S26, the ranking unit 201 determines whether the high SOC ratio is less than 70%. When the high SOC ratio is less than 70% (YES in S26), the ranking unit 201 recognizes the user's vehicle usage as "commuting use", and sets the user's insurance rank as rank C in S27. When the high SOC ratio is 70% or more (NO in S26), the ranking unit 201 recognizes the user's vehicle usage as "shopping use", and sets the user's insurance rank as rank C in S28. The commuting use is vehicle usage in which a vehicle is used for commuting (e.g., moving between home and company). The shopping use is vehicle usage in which a vehicle is used for shopping (e.g., moving between home and store). Since the same insurance rank is set in S27 and S28 of FIG. 12, S26 may be omitted if the commuting use/the shopping use is not discriminated.

If NO is determined in S23, the ranking unit 201 recognizes the user's vehicle usage as "two-time charging", and sets the user's insurance rank as rank C in S29. The two-time charging is vehicle usage in which the external charging of the battery 11 is performed twice a day.

When the insurance rank of the user (the purchaser of the second vehicle) is updated in any one of S22, S25, S27, S28, and S29, the process (S301 in FIG. 10) shown in FIG. 12 ends, and the process proceeds to S302 in FIG. 10. If NO is determined in S20, the ranking unit 201 recognizes the user's vehicle usage as "traveling every day", and starts the process shown in FIG. 13 described below. Daily driving is how to use a vehicle in which the vehicle is driven daily. "Z2" in FIG. 12 corresponds to the start of the process shown in FIG. 13.

Figure 13:
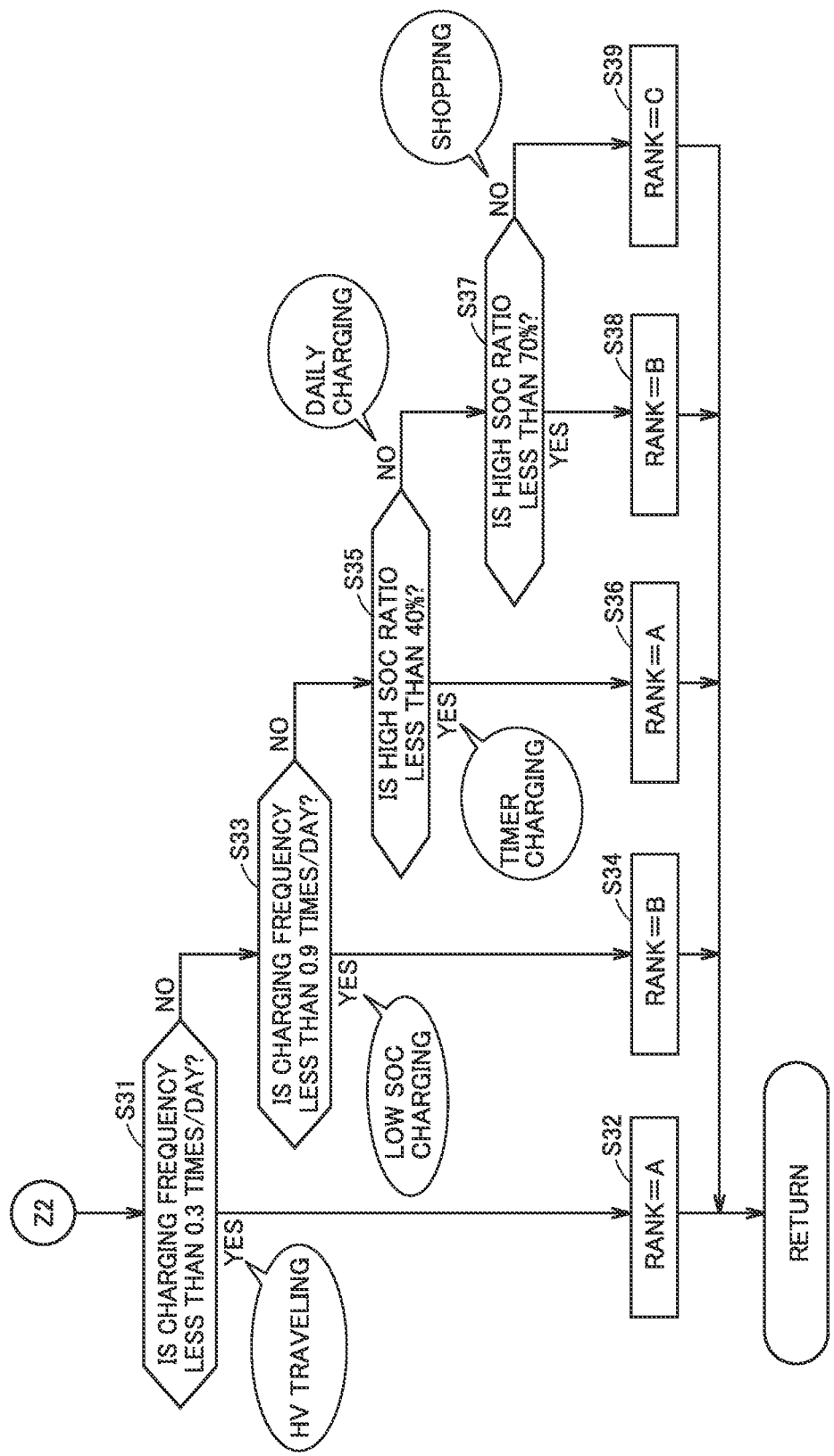
FIG. 13 is a third flowchart showing the ranking process shown in FIG. 10.

FIG. 13 is a third flowchart showing ranking processing executed in S301 of FIG. 10. Referring to FIGS. 3 and 5 and FIG. 13, in S31, the ranking unit 201 determines whether or not the charging frequency of the user (the purchaser of the second vehicle) is less than 0.3 times/day. When the charging frequency is less than 0.3 times/day (YES in S31), the ranking unit 201 recognizes the user's vehicle usage as "HV traveling", and sets the user's insurance rank as rank A in S32.

When the charging frequency is 0.3 times/day or more (NO in S31), the ranking unit 201 determines whether or not the charging frequency is less than 0.9 times/day in S33. When the charging frequency is less than 0.9 times/day (YES in S33), the ranking unit 201 recognizes the user's vehicle usage as "low SOC charging", and sets the user's insurance rank as rank B in S34. When the charging frequency is 0.9 times/day or more (NO in S33), the ranking unit 201 determines whether or not the high SOC ratio of the user is less than 40% in S35.

If the high SOC ratio is less than 40% (YES in S35), the ranking unit 201 recognizes the user's vehicle usage as "timer charging", and sets the user's insurance rank as rank A in S36. The timer charging means how to use the vehicle in which the timer charging is performed so as to suppress an increase in the high SOC ratio.

When the high SOC ratio is 40% or more (NO in S35), the ranking unit 201 recognizes the user's vehicle usage as "daily charging", and the process proceeds to S37. In S37, the ranking unit 201 determines whether the high SOC ratio is less than 70%. When the high SOC ratio is less than 70% (YES in S37), the ranking unit 201 recognizes the user's vehicle usage as "commuting use", and sets the user's insurance rank as rank B in S38. When the high SOC ratio is 70% or more (NO in S37), the ranking unit 201 recognizes the user's vehicle usage as "shopping use", and sets the user's insurance rank as rank C in S39.

When the insurance rank of the user (the purchaser of the second vehicle) is updated in any one of S32, S34, S36, S38, and S39, the process (S301 in FIG. 10) shown in FIG. 13 ends, and the process proceeds to S302 in FIG. 10.

Hereinafter, the relationship between the vehicle usage and the ease of degradation of the power storage device (e.g., battery 11) will be described with reference to FIGS. 14 and 15. Hereinafter, an SOC of 70% or more is referred to as "high SOC", an SOC of more than 30% and less than 70% is referred to as "middle SOC", and an SOC of 30% or less is referred to as "low SOC".

Figure 14:
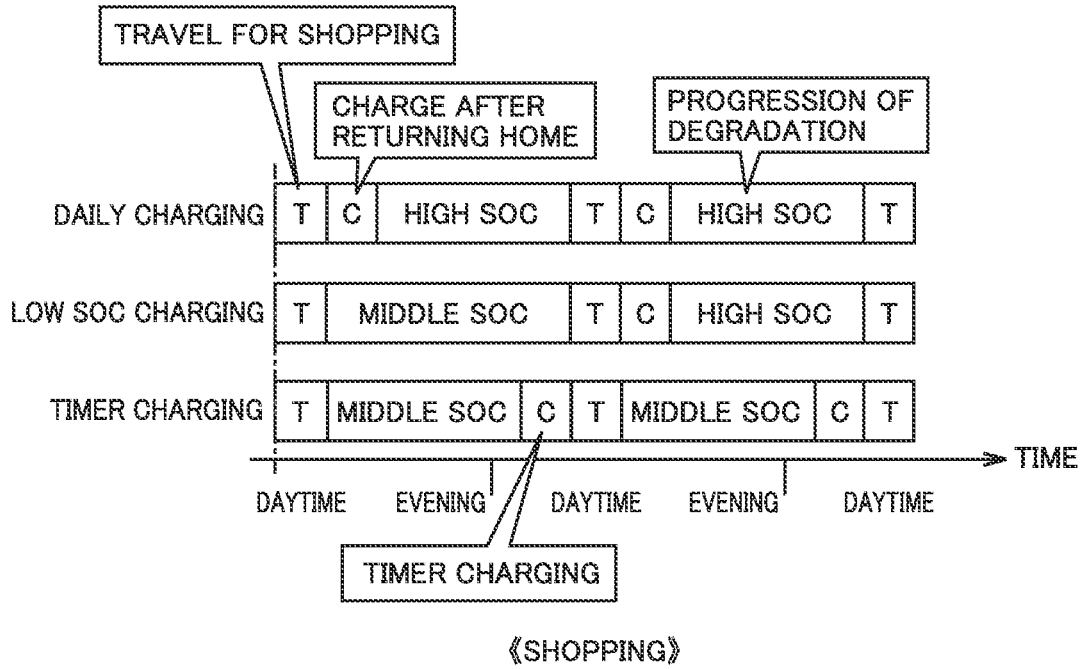
FIG. 14 is a time chart showing an example of a state transition of a vehicle used for shopping.

FIG. 14 is a time chart showing an example of a state transition of a vehicle used for shopping. In each of FIG. 14 and FIG. 15 described later, a period during which the vehicle is in a traveling state is denoted by "T", and a period during which the vehicle is in a charging state is denoted by "C". The periods during which the vehicle is left in a high SOC state, a middle SOC state, and a low SOC state of the power storage device are referred to as "high SOC state", "middle SOC state", and "low SOC state", respectively.

Referring to FIG. 14, a user who uses a vehicle for shopping gets on the vehicle from his/her home and goes out of the shopping, and goes back on the vehicle after the shopping is finished. In daily charging, the user charges the power storage device of the vehicle after returning home. In the low SOC charging, the user does not charge the power storage device if the power storage device of the vehicle has not reached the low SOC after returning home, and the user charges the power storage device if the power storage device of the vehicle has reached the low SOC after returning home. In the case of timer charging, the user does not charge the power storage device of the vehicle after returning home, and charges the power storage device immediately before the start of traveling of the vehicle by using timer charging. Degradation of the power storage device is particularly likely to progress during a high SOC inactive period. As shown in FIG. 14, the length of the high SOC inactive period tends to be "daily charging>low SOC charging>timer charging". For this reason, the degree of degradation of the power storage device tends to be also "daily charging>low SOC charging>timer charging". Thus, by using timer charging, the power storage device is less likely to deteriorate.

Figure 15:
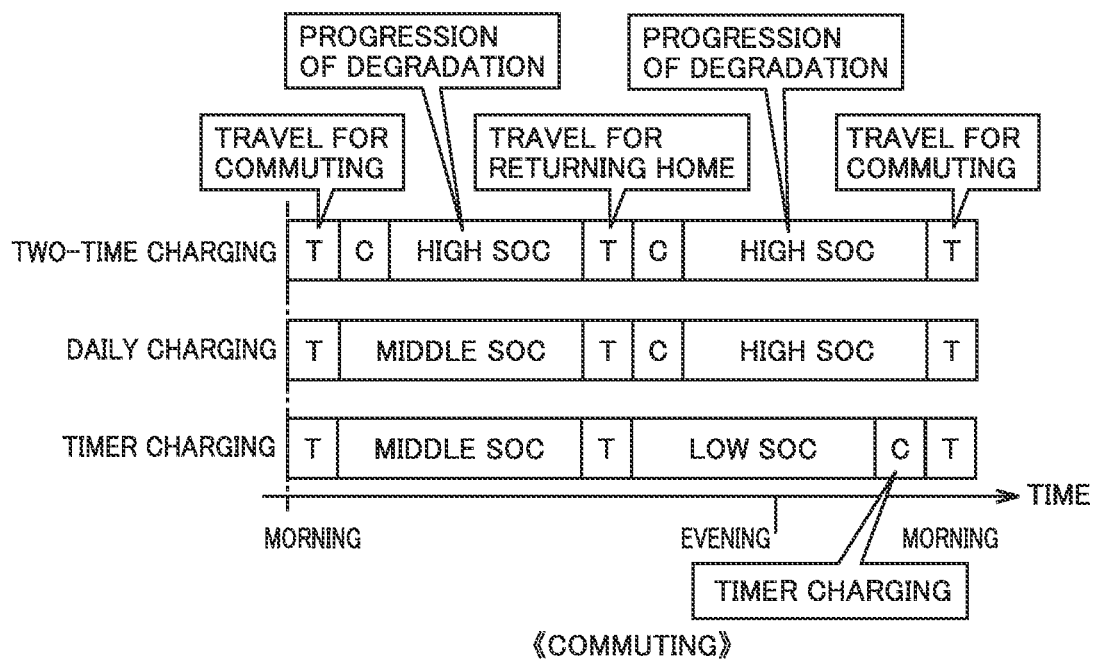
FIG. 15 is a time chart showing an example of a state transition of a vehicle used for commuting.

FIG. 15 is a time chart showing an example of a state transition of a vehicle used for commutation. Referring to FIG. 15, a user who uses a vehicle for commuting goes to a work place from the home in the morning and goes to the home in the evening. During the working time, the vehicle is left in work place. In the two-time charging, the user charges the power storage device of the vehicle at the work place, and charges the power storage device of the vehicle again after returning home. In daily charging, the user charges the power storage device of the vehicle after returning home. In the case of timer charging, the user charges the power storage device of the vehicle immediately before starting driving in the commuting use by using timer charging. As shown in FIG. 15, the length of the high SOC inactive period tends to be "two-time charging>daily charging>timer charging". Therefore, the ease of degradation of the power storage device tends to be "two-time charging>daily charging>timer charging".

As shown in FIG. 14 and FIG. 15, the daily charging in the shopping use tends to have a longer high SOC inactive period than the daily charging in the commuting use. Thus, the power storage device tends to deteriorate more easily in the shopping use than in the commuting use. Although not shown in FIG. 14, the two-time charging tends to degrade the power storage device more easily than the "daily charging" even in the shopping use, as in the commuting use. Although not shown in FIG. 15, in the commuting use, similarly to the shopping use, the "low SOC charging" tends to be less likely to degrade the power storage device than the "daily charging", and degrade the power storage device more easily than the "timer charging". Further, in the "HV traveling", since the SOC of the battery 11 is basically maintained at a low SOC or a middle SOC, the high SOC ratio is low. Therefore, when the vehicle is used in HV traveling, the battery 11 is less likely to deteriorate.

In the processes shown in FIGS. 11 to 13, the user is ranked based on the relationship between the vehicle usage and the ease of degradation of the power storage device. In S301 of FIG. 10, the ranking unit 201 increases the user's insurance rank as the user's vehicle usage is vehicle usage in which the capacity retention ratio of the power storage device is easily maintained at a high level by the processing shown in FIGS. 11 to 13. As the degradation of the power storage device progresses, the capacity retention ratio of the power storage device decreases.

Figure 16:
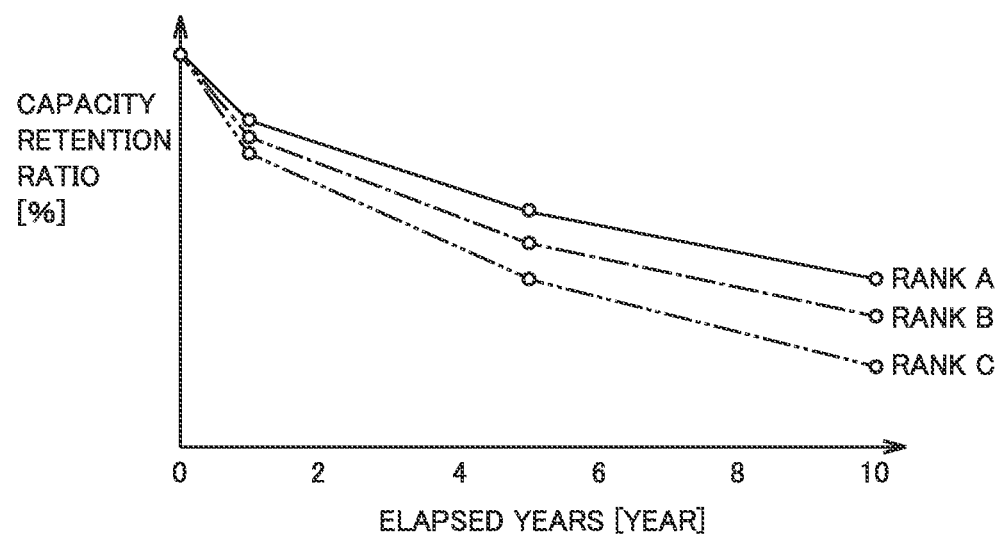
FIG. 16 is a diagram showing transitions of capacity retention ratios of batteries in vehicles used by users ranked in ranks A, B, and C by the processes shown in FIGS. 11 to 13.

FIG. 16 is a diagram showing the transition of the capacity retention ratio of the batteries mounted on the PHEV when each user having ranks A, B, and C set by the processing shown in FIGS. 11 to 13 uses the same type of PHEV for 10 years under the condition of the monthly traveling distance of 1000 km or more and 2000 km or less. As shown in FIG. 16, the manner in which the capacity retention ratio of the battery decreases tends to differ depending on the user's insurance rank. The rank A, rank B, and rank C were obtained when the insurance ranks were arranged from a higher battery capacity retention ratio. Thus, the higher the user's insurance rank, the higher the capacity retention ratio of the battery.

Referring again to FIGS. 3 and 5 and FIG. 10, in S302, the insurance premium determination unit 202 determines the renewal fee of the insurance contract based on the insurance rank of the user (the purchaser of the second vehicle). The insurance premium determination unit 202 may determine the renewal fee by referring to the fee table shown in FIG. 8.

Referring to FIG. 8, the renewal fee is a fee for extending the subject period. The user can extend the subject period for a predetermined period of time (e.g., one year) by paying a renewal fee. In the fee table shown in FIG. 8, the renewal fee changes depending on the insurance rank of the user (vehicle purchaser). When the user's insurance ranks are ranks A, B, and C, the renewal fees (the fee for extending the subject period by one year) are 5000 yen, 7500 yen, and 10000 yen, respectively. Thus, the higher the user's insurance rank is, the lower the renewal fee becomes.

As described above, the ranking unit 201 according to this embodiment is configured to increase the user's insurance rank as the user (the purchaser of the second vehicle) uses the vehicle in such a manner that the capacity retention ratio is easily maintained high (see FIGS. 11 to 16). In this embodiment, as shown in FIG. 8, the lower the user's insurance rank, the higher the renewal fee. Thus, by increasing the renewal fee of the user who uses the vehicle in such a manner that degradation of the power storage device is promoted, it is possible to suppress such an increase in the user. Referring again to FIGS. 3 and 5 and FIG. 10, in S303, the registration unit 203 bills the user for the renewal fee determined in S302. The registration unit 203 may notify the mobile terminal 20 carried by the user of the renewal fee. For example, the user can pay a renewal fee to the dealer P2 by a cacheless payment by operating the mobile terminal 20.

In S304, the registration unit 203 determines whether the renewal fee is paid by the user. S303 and S304 may be processes corresponding to S203 and S204 of FIG. 7, respectively. If the renewal fee is paid (YES in S304), the registration unit 203 extends the subject period (see FIG. 4) included in the insurance information of the user registered in the user information DB 232 in S305. The extension period may be fixed (e.g., one year). The subject period may be extended for a plurality of years by paying for a plurality of years of renewal fees.

If the renewal fee is not paid (NO in S304), the registration unit 203 does not extend the subject period (S306). In this case, the second vehicle is excluded from the subject matter insured due to expiration of the subject period registered in the user information DB 232.

In this embodiment, the initial subject period is set by the process shown in FIG. 7, and the subject period is extended by the process shown in FIG. 10. When the user (the purchaser of the second vehicle) continues to renew the insurance contract, the process shown in FIG. 10 is executed before the expiration of the subject period, and the subject period is extended each time the process of S305 in FIG. 10 is executed. When the user sells the second vehicle to the dealer P2 within the subject period, the dealer terminal 200 executes the process shown in FIG. 6 for the second vehicle. Hereinafter, a process executed by the dealer terminal 200 when the second vehicle is sold will be described with reference to FIG. 6.

Referring to FIG. 6 together with FIG. 3 and FIG. 5, S101 to S108 are similar to the above-described processing at the time of selling the first vehicle, and thus the description thereof will be omitted.

When the price X1 (the asset price of the battery 11 indicated by the result of the performance evaluation test) is equal to or greater than the price X2 (reference price) (YES in S104), the ranking unit 201 sets the rank A as the user's insurance rank in S106, and the sales price determination unit 205 sets the price X1 as the sales price of the battery 11 in S110. When the price X1 of the second vehicle is higher than the price X2, the insurance benefit determination unit 204 sets the insurance benefit to 0 (no insurance benefit).

When the price X1 is less than the price X2 and the difference X3 is less than Th (NO in S105), the ranking unit 201 sets the rank B as the insurance rank of the user in S107, and the process proceeds to S109.

When the price X1 is less than the price X2 and the difference X3 is equal to or greater than Th (YES in S105), the ranking unit 201 sets the rank C as the insurance rank of the user in S108, and the process proceeds to S109. Since the second vehicle has subscribed to insurance, YES is determined in S109, and the process proceeds to S111.

In S111, the insurance benefit determination unit 204 determines the difference X3 as the insurance benefit, and the sales price determination unit 205 determines the price X2 (=price X1+difference X3) as the sales price of the battery 11. Thus, when the second vehicle (subject vehicle) is sold within the subject period, the insurance benefit determination unit 204 determines an insurance benefit that compensates for the loss of the asset value due to degradation of the battery 11. When the price X1 of the second vehicle is lower than the price X2, the insurance benefit determination unit 204 determines the difference X3 as the insurance benefit. When the price X1 of the second vehicle is lower than the price X2, the sales price determination unit 205 sets the price X2 (the amount obtained by compensating the difference X3 with the insurance benefit) as the sales price of the battery 11. By applying insurance when the asset price of the battery 11 is lower than the reference price, it is possible to prevent the asset value of the user (purchaser of the subject vehicle) from decreasing excessively due to degradation of the battery 11.

As described above, the vehicle sales method according to this embodiment is a method of selling a second vehicle having a second power storage device to a user who has sold the first vehicle having the first power storage device. The vehicle sales method includes information acquisition processing (S101 in FIG. 6 at the time of selling the first vehicle), ranking processing (S101 to S108 in FIG. 6 at the time of selling the first vehicle), sales processing (FIG. 7), insurance premium determination processing (S202 in FIG.

7), registration processing (S205 in FIG. 7), and insurance premium determination processing (S111 in FIG. 6 at the time of selling the second vehicle). In the information acquisition process, vehicle usage information relating to how the user uses the first vehicle is acquired. In the ranking process, the user is ranked using the vehicle usage information. In the sales process, the second vehicle is sold to the user. In the insurance premium determination process, the insurance premium for the subject period is determined using the rank of the user. In the registration process, when the insurance premium for the subject period is paid, the second vehicle and the subject period are registered. In the insurance benefit determination process, when the second vehicle is sold within the subject period, the insurance benefit for compensating for the loss of the asset value due to degradation of the second power storage device is determined. According to such a vehicle sales method, it is possible to provide an insurance service that compensates for at least a part of loss of asset value due to degradation of the power storage device used in the subject vehicle.

In the above embodiment, the dealer terminal 200 includes a ranking unit 201, an insurance premium determination unit 202, a registration unit 203, an insurance benefit determination unit 204, and a sales price determination unit 205 (FIG. 5). This is not exclusive, however, at least a part of the functions of the dealer terminal 200 may be implemented in a server belonging to the automobile manufacturer P1.

Figure 17:
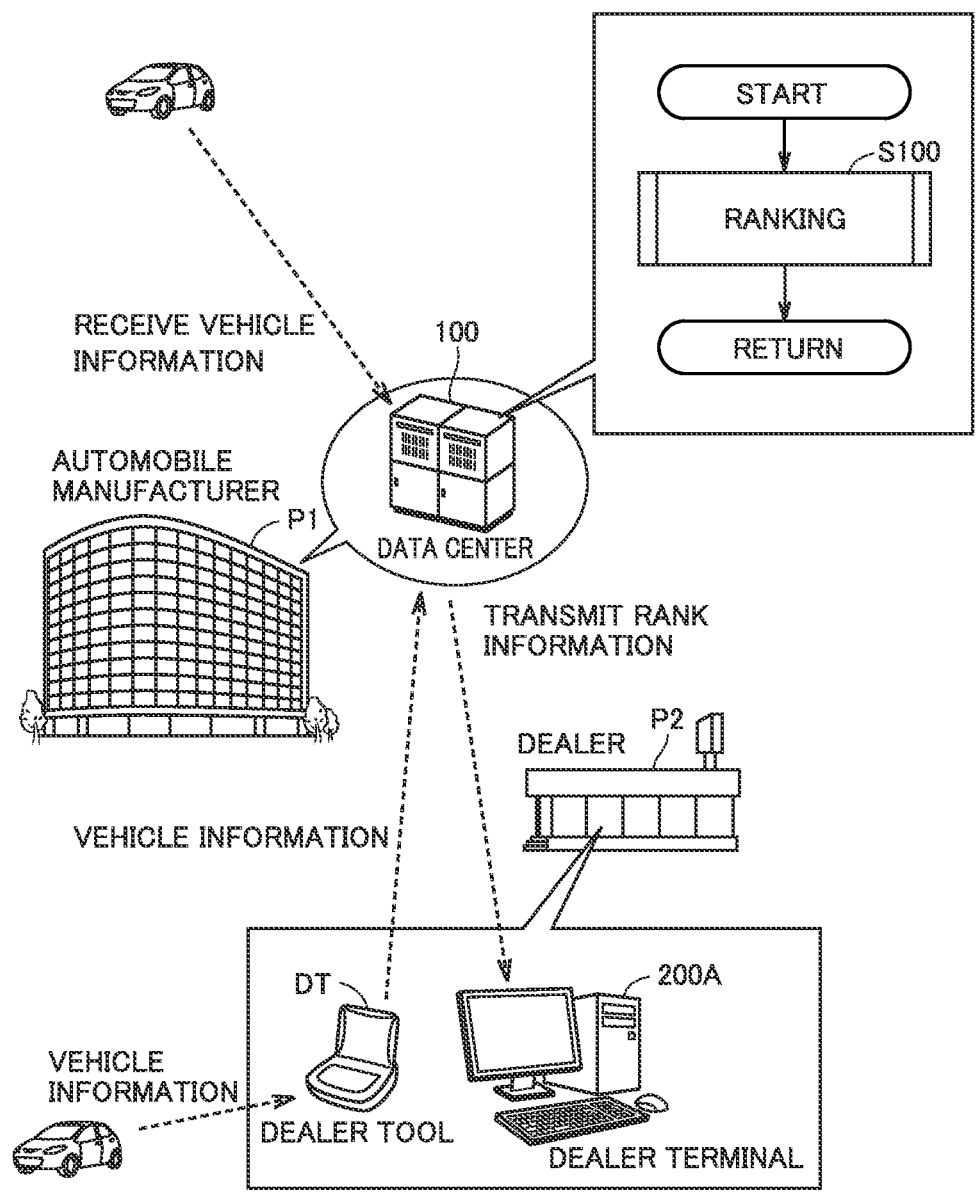
FIG. 17 is a diagram for explaining a modified example of the configuration of the dealer terminal shown in FIG. 5.

FIG. 17 is a diagram for explaining a modified example of the configuration of the dealer terminal 200 shown in FIG. 5. Referring to FIG. 17, in this modified example, a server 100 is installed in a data center of an automobile manufacturer P1. Each vehicle sold by the dealer P2 is registered in the server 100. The server 100 sequentially receives the latest vehicle information (including the vehicle usage information) from each registered vehicle by wireless communication. Vehicle information (including vehicle usage information) acquired by the dealer tool DT from the registered vehicle in the dealer P2 may be transmitted from the dealer tool DT or the dealer terminal 200A to the server 100. The server 100 ranks the registered vehicle user using the acquired vehicle usage information, and stores the ranking result. The server 100 executes ranking (S100) each time new vehicle usage information is acquired. The ranking (S100) is, for example, the processing shown in FIGS. 11 to 13. The server 100 transmits rank information (a result of ranking) to the dealer terminal 200A in response to a request from the dealer terminal 200A.

The dealer terminal 200A according to this modified example executes the process shown in FIG. 10 similarly to the dealer terminal 200 described above, but executes a process of requesting the server 100 to transmit the rank information instead of the process of S301 in FIG. 10. The dealer terminal 200A can execute the process of S302 in FIG. 10 using the rank information received from the server 100. According to the above modified example, even if the subject vehicle does not arrive at the dealer P2, the dealer terminal 200A can execute the process related to the insurance renewal.

The insurance benefit determination unit 204 may be configured to increase the upper limit amount of payment of the insurance benefit as the user's insurance rank increases. For example, when the user sells the subject vehicle, the process shown in FIG. 18 described below may be executed.

FIG. 18 is a flowchart showing a modified example of the process shown in FIG. 6. The process (S201 to S205) at the time of purchase of the vehicle shown in FIG. 18 is the same as the process shown in FIG. 7. In the following description, it is assumed that the processing of S201 to S205 is executed when the user purchases the subject vehicle, and the subject vehicle has subscribed to insurance by the processing of S205. Like the vehicle 10, the subject vehicle has the configuration shown in FIG. 3.

Referring to FIG. 18 together with FIG. 3 and FIG. 5, when the subject vehicle is sold, the processes of S101, S102, S103A, S104A, and S105A are sequentially executed for the subject vehicle. In S101 and S102 of FIG. 18, as in S101 and S102 of FIG. 6, price X1 and price X2 are acquired for the subject vehicle. In S103A, the insurance premium determination unit 202 acquires the user's insurance rank from the user information DB 232. In S104A, the insurance benefit determination unit 204 determines an insurance limit (maximum coverage amount) based on the insurance rank of the user. The insurance benefit determination unit 204 may determine the insurance limit by referring to a fee table shown in FIG. 19 described below.

FIG. 19 is a diagram showing a modified example of the fee table shown in FIG. 8. Referring to FIG. 19, the insurance limit corresponds to an upper limit of the insurance benefit. In the fee table shown in FIG. 19, the insurance limit changes depending on the user's insurance rank. When the user's insurance ranks are ranks A, B, and C, the insurance limits are 500,000 yen, 400,000 yen, and 300,000 yen, respectively. Thus, the higher the user's insurance rank is, the higher the insurance limit becomes.

Referring again to FIGS. 3 and 5 and FIG. 18, in S105A, the sales price determination unit 205 determines the sales price of the battery 11 mounted on the subject vehicle using at least one of the price X1, the price X2, and the insurance limit obtained in S101, S102, and S104A, respectively. When the asset value of the battery 11 is lost due to degradation, the insurance benefit determination unit 204 determines an insurance benefit to compensate for at least a part of the loss.

Specifically, when the price X1 is equal to or greater than the price X2, the sales price determination unit 205 sets the price X1 as the sales price of the battery 11 in S105A. When the price X1 is less than the price X2, the difference X3 (loss of asset value due to degradation of the battery 11) is compensated by the insurance benefit within the insurance limit. For example, when the difference X3 is 400,000 yen and the user's insurance rank is rank C, 300,000 yen (see FIG. 19), which is the insurance limit, is compensated by the insurance benefit, and the remaining 100,000 yen becomes a self-load. In this case, the amount obtained by subtracting 100,000 yen from the price X2 is the sales price of the battery 11.

In the case of a user who previously subscribed the insurance but currently does not subscribe the insurance, when such a user is to subscribe the insurance again after installing a used battery in the vehicle as a secondary use of the battery, the process shown in FIG. 7 or 18 may be performed. Then, in S201 (FIG. 7 or 18), the previous insurance rank may be obtained and applied to this user. The user can be assigned the previous insurance rank again. Such a service promotes reuse of the battery.

When the rank of the user indicated by the result of the ranking is lower than a predetermined rank (hereinafter referred to as "target rank"), the ranking unit 201 may be configured to use information obtained from the ranking to identify the cause for lowness of the rank of the user, and transmit a report indicating the identified cause to the user. The report may include an advice regarding rank improvement. When starting the process shown in FIG. 10, the dealer terminal 200 may perform, in parallel, the process shown in FIG. 20 described in the following.

FIG. 20 is a flowchart showing a process related to creation and transmission of the above-described report. Referring to FIG. 20 together with FIGS. 3 and 5, in S401, the dealer terminal 200 determines whether or not the process (ranking) in S301 of FIG. 10 has been completed. When the step of S301 of FIG. 10 has been completed (YES in S401), the process proceeds to S402. In S301 of FIG. 10, the ranking is performed through the processes shown in FIGS. 11 to 13.

In S402, the ranking unit 201 determines whether or not the insurance rank of the user indicated by the result of the ranking is lower than rank A (target rank). When the insurance rank of the user is rank A (NO in S402), the series of steps shown in FIG. 20 is completed. In contrast, when the insurance rank of the user is rank B or rank C (YES in S402), the steps of S403, S404, and S405 are performed sequentially.

In S403, the ranking unit 201 identifies the cause for lowness of the insurance rank of the user (cause for the reduction of the rank) based on the information obtained from the ranking (see FIGS. 11 to 13). The information used for identifying the cause for the reduction of the rank is not limited to the information obtained from the ranking, but other type of information may be used in addition to the information obtained from the ranking. Examples of the information used for identifying the cause for the reduction of the rank may include traveling distance, traveling frequency, charging frequency, and upper limit of the SOC.

The insurance rank may be reduced when the traveling distance is short (e.g., 500 km or more and less than 1000 km), the car is driven to travel every day and charged each time the travel ends, and the battery is left as it is in the fully charged state (hereinafter also referred to as "first cause"). The insurance rank may also be reduced when the traveling frequency is low and the battery is left as it is in the fully charged state for days in which the car is not driven (hereinafter also referred to as "second cause"). The insurance rank may also be reduced when the traveling distance is long (e.g., 1000 km or more and less than 2000 km), the car is driven to travel every day and charged each time the travel ends, and the battery is left as it is in a high SOC state (hereinafter also referred to as "third cause"). The insurance rank may also be reduced when the frequency of HV traveling of a PHEV is high (hereinafter also referred to as "fourth cause").

In S403, the ranking unit 201 may identify which of the first to fourth causes is the cause for the reduction of the rank. In S403, the ranking unit 201 may identify a cause other than the first to fourth causes, as a cause for the reduction of the rank.

In S404, based on the cause for the reduction of the rank identified in S403, the ranking unit 201 obtains an advice regarding rank improvement (i.e., an advice for increasing the insurance rank). For example, the dealer terminal 200 may manage, by means of the storage 213, an advice for each cause for the reduction of the rank, and obtain an advice from the storage 213, associated with the cause for the reduction of the rank identified in S403.

For each of the first cause and the second cause, an advice to charge the battery after decrease of the SOC may be obtained (hereinafter also referred to as "first advice"). For the third cause, an advice to use timer charging (hereinafter also referred to as "second advice") may be obtained. For the fourth cause, an advice to do EV traveling (traveling with the motor with the engine stopped) and use timer charging on the PHEV (hereinafter also referred to as "third advice") may be obtained. In S404, the ranking unit 201 may obtain any of the first to third advices as an advice for improvement of the rank. The first to third advices may be stored in the storage 213 in advance.

In S405, the ranking unit 201 creates a report (report document) indicating a cause for the reduction of the rank and an advice obtained respectively in S403 and S404, and the ranking unit 201 issues the created report to the user. For example, the ranking unit 201 transmits the report to the mobile terminal 20 carried by the user. When the step of S405 has been performed, the series of steps shown in FIG. 20 is completed.

The user can increase the rank in accordance with the advice indicated by the report (S405), to thereby reduce the insurance fee. To the user increasing the rank in accordance with the advice, a point(s) that can be used at the dealer may be given. Instead of the dealer terminal 200, the server 100 shown in FIG. 17 may perform the process shown in FIG. 20. In the example shown in FIG. 20, the target rank is rank A (highest rank). The target rank, however, is not limited to this, but may be set for each user (purchaser). For example, the dealer terminal 200 or the server 100 may manage the target rank for each user, and change the target rank depending on the user.

The ranking unit 201 may be configured to specify the vehicle usage of the user using information obtained by ranking, and to guide the user to replace the vehicle using the specified vehicle usage. When starting the process shown in FIG. 10, the dealer terminal 200 may execute the process shown in FIG. 21 described below in parallel.

Figures 21, 22:
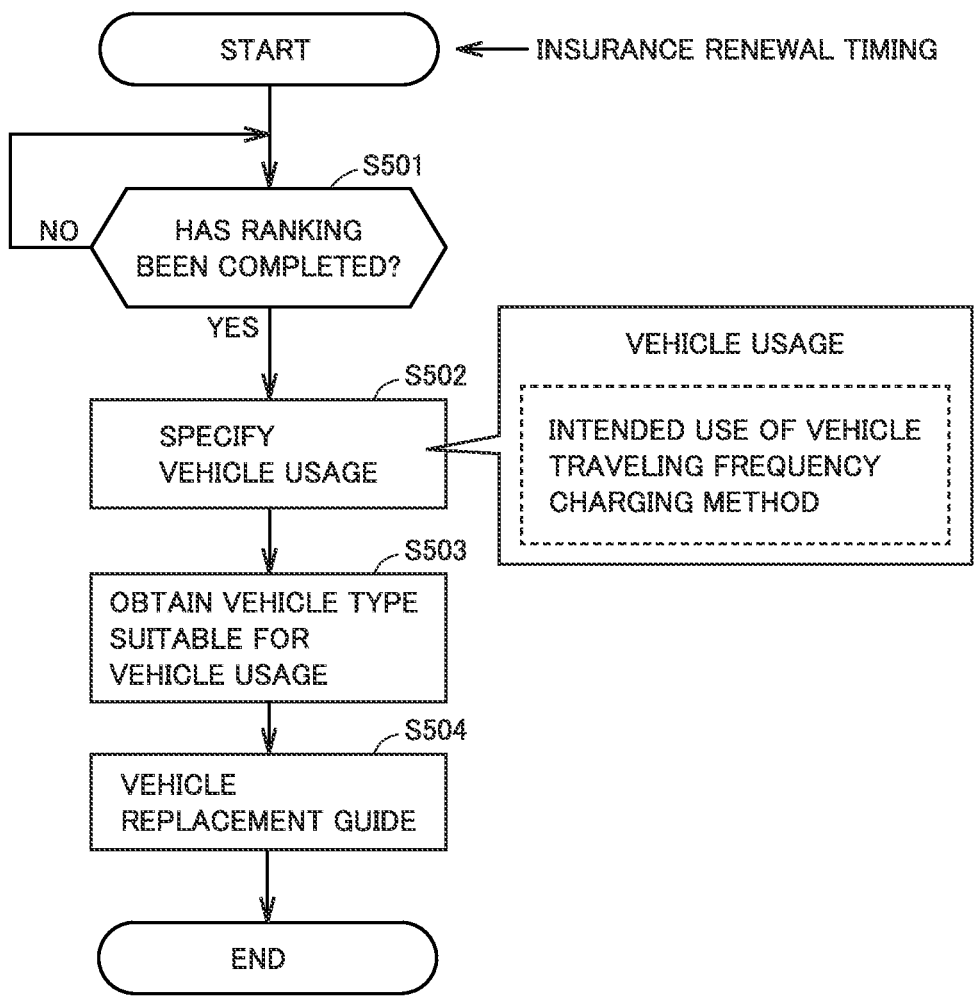
FIG. 21 is a flowchart showing a process related to vehicle replacement guidance in a modified example of the vehicle insurance system.
FIG. 22 is a diagram showing an example of user information in which the vehicle usage is added.

FIG. 21 is a flowchart showing a process related to vehicle replacement guidance. Referring to FIG. 21 together with FIGS. 3 and 5, in S501, the dealer terminal 200 determines whether or not the process (ranking) of S301 of FIG. 10 is completed. When the process of S301 in FIG. 10 is completed (YES in S501), the process proceeds to S502. In S301 of FIG. 10, ranking is executed by the processes shown in FIGS. 11 to 13.

In S502, the ranking unit 201 uses the information obtained from the ranking (the processing shown in FIGS. 11 to 13) to specify the vehicle usage (for example, the traveling frequency, the charging method, and the intended use of the vehicle) of the user of the subject vehicle, and stores the specified vehicle usage in the user information DB 232. For example, by the processing shown in FIGS. 11 to 13, it is possible to specify whether the traveling frequency of the user is the weekend traveling, the weekday traveling, or the daily traveling. In addition, according to the processes shown in FIGS. 11 to 13, it is possible to specify whether the user's charging method is the HV traveling, the timer charging, the low SOC charging, the daily charging, or the two-time charging. According to the processes shown in FIGS. 11 to 13, it is possible to specify whether the user's intended use of the vehicle is the shopping use or the commuting use. In addition, when the traveling frequency of the user is the weekend traveling, the ranking unit 201 may recognize the user's intended use of the vehicle is "leisure use".

FIG. 22 is a diagram showing an example of user information in which the vehicle usage is added. As shown in FIG. 22, the user information stored in the user information DB 232 may include the traveling frequency, the charging method, and the intended use of the vehicle of each user.

Referring again to FIGS. 3 and 5 and FIG. 21, in S503, the ranking unit 201 acquires a vehicle type corresponding to the vehicle usage identified in S502. The ranking unit 201 may acquire a vehicle type suitable for the user's usage of the subject vehicle by searching a database held by the vehicle manufacturer P1. The retrieval method is arbitrary, and an AI (artificial intelligence) that is machine-learned using the big data may be used for the retrieval. Users similar to each other in terms of the way in which the user uses a vehicle may be grouped together, and the degree of satisfaction for each vehicle type obtained for each user group may be stored in a database. The ranking unit 201 may identify a vehicle type having a high degree of satisfaction in the user group corresponding to the vehicle usage specified in S502, as a vehicle type suitable for the vehicle usage.

In S504, the ranking unit 201 guides the user of the subject vehicle to buy the vehicle type (hereinafter referred to as "recommended vehicle type") acquired in S503. More specifically, the ranking unit 201 notifies the mobile terminal 20 carried by the user of the subject vehicle of information relating to the recommended vehicle type (e.g., specifications, prices, and recommended reasons) and information relating to the replacement of vehicles (e.g., sales price of the subject vehicle, and procedure method). The information related to the replacement of the vehicle may include a difference between the purchase price of the recommended vehicle type and the sales price of the subject vehicle. The information related to the replacement of the vehicle may include guidance of the cashless payment. The user may operate the mobile terminal 20 in accordance with the guidance of the cashless payment, thereby replacing the vehicle by the cashless payment.

Instead of the dealer terminal 200, the server 100 shown in FIG. 17 may execute the process shown in FIG. 21.

The method of ranking is not limited to the method described above, and may be changed as appropriate. The ranking unit 201 may rank the user based on the user's intended use of the vehicle (e.g., shopping, commuting, leisure). The vehicle usage information may include a travel distance (for example, a month travel distance and/or a year travel distance). In ranking, the travel distance may be taken into account. The ranking unit 201 may change the ranking method according to the travel distance. The ranking method may be sequentially changed (optimized) by machine learning based on the result of the performance evaluation test (S101 in FIG. 6).

Figure 23:
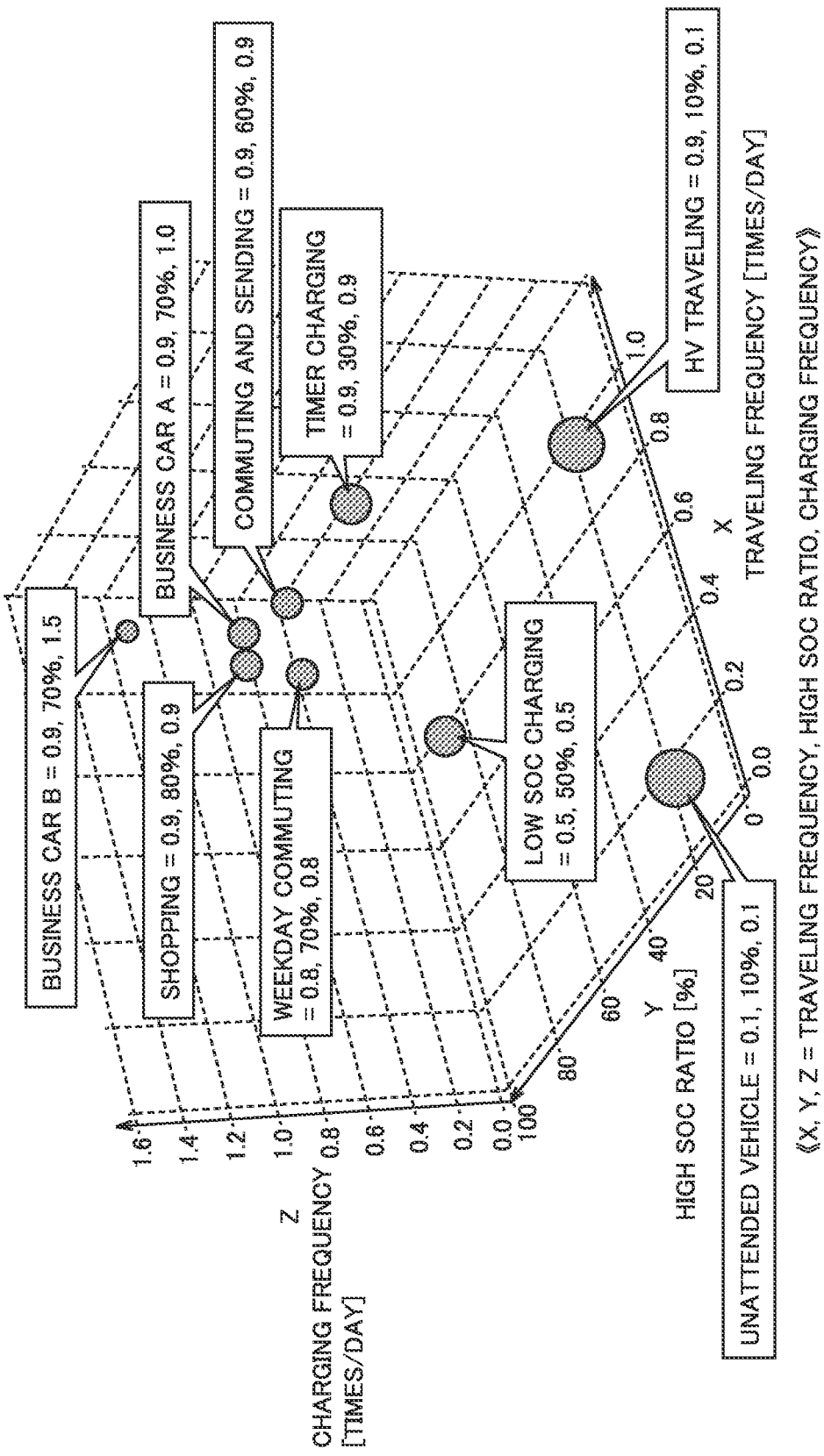
FIG. 23 is a diagram illustrating a modified example of the ranking method.

FIG. 23 is a diagram illustrating a modified example of the ranking method. The three-dimensional coordinate system shown in FIG. 23 is a coordinate system in which the traveling frequency, the high SOC ratio, and the charging frequency are X-axis, Y-axis, and Z-axis, respectively. In this three-dimensional coordinate system, the number of times the vehicle travels per day (the number of trips) is employed as the "traveling frequency (X axis)", the ratio of the time during which the SOC of the power storage device is equal to or greater than a predetermined value in the inactive period is employed as the "high SOC ratio (Y axis)", and the number of times of external charging of the power storage device per day is employed as the "charging frequency (Z axis)".

The ranking unit 201 may rank the user of the subject vehicle using the traveling frequency, the high SOC ratio, and the charging frequency of the subject vehicle. When the traveling frequency of the subject vehicle is close to 0 (e.g., 0.2 times/day or less), there is a possibility that maintenance of the subject vehicle is insufficient. Therefore, the ranking unit 201 may set the user's insurance rank of the subject vehicle to the minimum rank (e.g., rank C). In addition, the ranking unit 201 may increase the insurance rank for a user having a lower SOC ratio in a group of users having substantially the same traveling frequency. In addition, the ranking unit 201 may increase the insurance rank for a user having a lower charging frequency in a group of users having substantially the same traveling frequency and high SOC ratio.

Further, the ranking unit 201 may specify how to use vehicles for the user of the subject vehicle by plotting the data (traveling frequency, high SOC ratio, and charging frequency) of the subject vehicle in the three-dimensional coordinate system. For example, when the data of the subject vehicle is plotted in the vicinity of the coordinates of each usage of vehicles shown in FIG. 23, the vehicle usage (Any one of unattended vehicle/timer charging/low SOC charging/HV traveling/shopping/weekday commuting/commuting and sending/business car A/business car B) corresponding to the coordinates may be specified as the usage of vehicles of the user of the subject vehicle.

The length of the subject period is not limited to one year, and may be changed as appropriate. The length of the subject period may be 2 to 5 years or 6 years or more. The length of the extension period is not limited to one year, and may be changed as appropriate. Further, it is not essential to execute processing related to insurance renewal. The process related to insurance renewal may be omitted.

The fee tables shown in FIGS. 8 and 19 are merely examples, and can be changed as appropriate. In the above-described embodiment, the insurance rank is ranked in three classes (A/B/C), but the number of classes of the insurance rank is not limited to three, and may be any number, 4 to 9, or 10 or more. The insurance service fee classes (see FIGS. 8 and 19) may be increased along with the insurance rank classes.

The dealer P2 may sell a used vehicle (a vehicle on which the used power storage device is mounted). The vehicle information stored in the vehicle information DB 231 may include, instead of or in addition to the initial capacity of the power storage device, a capacity retention rate at the time of sales of the power storage device mounted on the used vehicle.

The configuration of the subject vehicle is not limited to the configuration shown in FIG. 3. For example, the subject vehicle is not limited to the PHEV, and may be a BEV (battery electric vehicle). The subject vehicle is not limited to a passenger car, but may be a bus or a truck. The subject vehicle may be configured to be wirelessly chargeable. The subject vehicle may be an autonomous vehicle or may perform a flying function. The subject vehicle may be a vehicle that can travel without human intervention (for example, an automated guided vehicle (AGV) or an agricultural implement).

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A vehicle insurance system comprising:
   a computer;
   a vehicle information database; and
   a user information database, wherein
   the vehicle information database stores vehicle usage information related to each sold vehicle in association with a vehicle ID for identifying each vehicle, the vehicle usage information including a number of vehicle trips per unit period, a number of charging operations of a vehicle-mounted power storage device per unit period, and a ratio of a time for which an SOC of a vehicle-mounted power storage device is a predetermined value or more in an inactive period, the user information database stores user information related to each user who purchases a vehicle in association with a user ID for identifying each user, the user information indicating a vehicle to be insured, a period to be insured, and an insurance rank of a user the computer is configured to determine, when a subject vehicle including a power storage device is sold, an insurance premium for a subject period of the subject vehicle, bill for the determined insurance premium, register the subject vehicle as the vehicle to be insured and the subject period as the period to be insured in the user information database when the determined insurance premium is paid, determine the insurance rank of a a purchaser of the subject vehicle based on on at least two from among the number of vehicle trips per unit period, the number of charging operations of a vehicle-mounted power storage device per unit period, and the ratio of a time for which an SOC of a vehicle-mounted power storage device is a predetermined value or more in an inactive period, of the subject vehicle before expiration of the subject period, and update the user information database based on the determined insurance rank, determine a renewal fee for extending the subject period based on the insurance rank of the purchaser, bill for the determined renewal fee, extend the subject period when the determined renewal fee is paid before expiration of the subject period, and determine, when the subject vehicle is sold within the subject period, an insurance benefit compensating for at least a part of a loss of asset value of the power storage device due to degradation of the power storage device of the subject vehicle.

2. The vehicle insurance system according to claim 1, wherein the vehicle usage information includes information about a capacity retention ratio of a vehicle-mounted power storage device, the computer ranks the purchaser higher as the vehicle usage keeps the capacity retention ratio higher, and when the computer determines the renewal fee, the computer sets the renewal fee lower as the purchaser is ranked higher.

3. The vehicle insurance system according to claim 1, wherein when an asset price of the power storage device indicated by a result of a performance evaluation test of the power storage device is lower than a reference price, the computer determines that the insurance benefit is a difference between the asset price of the power storage device, and the reference price, and determines that a sales price of the power storage device is the reference price.

4. The vehicle insurance system according to claim 3, wherein when the asset price of the power storage device indicated by the result of the performance evaluation test is higher than the reference price, the computer determines that the sales price of the power storage device is the asset price of the power storage device.

5. The vehicle insurance system according to claim 4, wherein the vehicle usage information includes a result of the performance evaluation test when the purchaser sells the subject vehicle, and the computer ranks the purchaser higher as the asset price of the power storage device indicated by the result of the performance evaluation test is higher.

6. The vehicle insurance system according to claim 1, wherein the computer sets an upper limit of the insurance benefit higher as the purchaser is ranked higher.

7. The vehicle insurance system according to claim 1, wherein when the insurance rank of the purchaser is lower than a predetermined rank, the computer identifies a cause for lowness of the insurance rank of the purchaser based on information obtained in a process of ranking, and transmits a report indicating the identified cause to the purchaser.

8. The vehicle insurance system according to claim 7, wherein the report includes an advice regarding improvement of the insurance rank.

9. The vehicle insurance system according to claim 1, wherein the computer identifies vehicle usage of the purchaser based on information obtained in a process of ranking, and guides the purchaser to buy a vehicle for replacement based on the identified vehicle usage.

10. The vehicle insurance system according to claim 9, wherein the computer is configured to acquire a vehicle type corresponding to the vehicle usage information, and guide the purchaser of the subject vehicle to buy another vehicle corresponding to the vehicle type.

11. The vehicle insurance system according to claim 1, wherein the computer is configured to specify how to use the subject vehicle for the purchaser of the subject vehicle by plotting data of the subject vehicle in a three-dimensional coordinate system, the data including traveling frequency, charging frequency and high SOC ratio, the traveling frequency is the number of vehicle trips per unit period, the charging frequency is the number of charging operations of a vehicle-mounted power storage device per unit period, and the high SOC ratio is the ratio of a time for which an SOC of a vehicle-mounted power storage device is a predetermined value or more in an inactive period.

12. A vehicle dealer terminal comprising:

a computer;

a connector for connecting a dealer tool;

a vehicle information database; and a user information database, wherein the vehicle information database stores vehicle usage information related to each sold vehicle in association with a vehicle ID for identifying each vehicle, the vehicle usage information including a number of vehicle trips per unit period, a number of charging operations of a vehicle-mounted power storage device per unit period, and a ratio of a time for which an SOC of a vehicle-mounted power storage device is a predetermined value or more in an inactive period, the user information database stores user information related to each user who purchases a vehicle in association with a user ID for identifying each user, the user information indicating a vehicle to be insured, a period to be insured, and an insurance rank of a user the computer is configured to determine, when a subject vehicle including a power storage device is sold, an insurance premium for a subject period of the subject vehicle, bill for the determined insurance premium, register the subject vehicle as the vehicle to be insured and the subject period as the period to be insured in the user information database when the determined insurance premium is paid, acquire the vehicle usage information from the dealer tool connected to the connector, and update the vehicle information database based on the acquired vehicle usage information, determine the insurance rank of a purchaser of the subject vehicle based on at least two from among the number of vehicle trips per unit period, the number of charging operations of a vehicle-mounted power storage device per unit period, and the ratio of a time for which an SOC of a vehicle-mounted power storage device is a predetermined value or more in an inactive period of the subject vehicle before expiration of the subject period, and update the user information database based on the determined insurance rank, determine a renewal fee for extending the subject period based on the insurance rank of the purchaser, bill for the determined renewal fee, extend the subject period when the determined renewal fee is paid before expiration of the subject period, and determine, when the subject vehicle is sold within the subject period, an insurance benefit compensating for at least a part of a loss of asset value of the power storage device due to degradation of the power storage device of the subject vehicle.

13. A vehicle insurance system comprising:

a vehicle dealer terminal including a computer; and a server, wherein the server is configured to receive vehicle usage information from each registered vehicle by wireless communication, the vehicle usage information including a number of vehicle trips per unit period, a number of charging operations of a vehicle-mounted power storage device per unit period, and a ratio of a time for which an SOC of a vehicle-mounted power storage device is a predetermined value or more to an inactive period, the server is configured to rank a user of the registered vehicle based on at least two from among the number of vehicle trips per unit period, the number of charging operations of a vehicle-mounted power storage device per unit period, and the ratio of a time for which an SOC of a vehicle-mounted power storage device is a predetermined value or more to an inactive period, and store an insurance rank of the user as a result of ranking, the server is configured to transmit rank the insurance rank to the vehicle dealer terminal in response to a request from the vehicle dealer terminal, the vehicle dealer terminal is configured to determine, when a subject vehicle including a power storage device is sold, an insurance premium for a subject period of the subject vehicle, bill for the determined insurance premium, register the subject vehicle as a vehicle to be insured and the subject period as a period to be insured when the determined insurance premium is paid, receive the insurance rank of a purchaser of the subject vehicle from the server before expiration of the subject period, determine a renewal fee for extending the subject period based on the insurance rank of the purchaser, bill for the determined renewal fee, extend the subject period when the determined renewal fee is paid before expiration of the subject period, and determine, when the subject vehicle is sold within the subject period, an insurance benefit compensating for at least a part of a loss of asset value of the power storage device due to degradation of the power storage device of the subject vehicle.

* * * * *